US009214048B2

(12) United States Patent

Brexel et al.

(10) Patent No.: US 9,214,048 B2

(45) Date of Patent: Dec. 15, 2015

(54) SYSTEM FOR FEEDING BANKNOTES TO A BANKNOTE TRANSPORTING UNIT WITH THE AID OF A DOCKING STATION

(75) Inventors: Dirk Brexel, Geseke (DE); Oliver Dietz, Borchen (DE); Dietmar Molitor, Paderborn (DE); Frank Lenzner, Altenstadt (DE); Yvonne Stoeckle, Obertshausen (DE)

(73) Assignee: Wincor Nixdorf International GmbH (DE)

( * ) Notice: Subject to any disclaimer, the term of this patent is extended or adjusted under 35 U.S.C. 154(b) by 509 days.

(21) Appl. No.: 13/521,840

(22) PCT Filed: Jan. 14, 2011

(86) PCT No.: PCT/EP2011/050463

§ 371 (c)(1),
(2), (4) Date: Sep. 4, 2012

(87) PCT Pub. No.: WO2011/086158

PCT Pub. Date: Jul. 21, 2011

(65) Prior Publication Data

US 2012/0323361 A1 Dec. 20, 2012

(30) Foreign Application Priority Data

Jan. 14, 2010 (DE) ......................... 10 2010 004 669

(51) Int. Cl.
*G06F 7/08* (2006.01)
*G07D 11/00* (2006.01)

(52) U.S. Cl.
CPC ........ *G07D 11/0006* (2013.01); *G07D 11/0009* (2013.01)

(58) Field of Classification Search
USPC .............. 235/375, 379, 380, 381; 705/43–45; 463/25, 29; 209/534; 221/255; 700/231
See application file for complete search history.

(56) References Cited

U.S. PATENT DOCUMENTS

| | | | | |
|---|---|---|---|---|
| 5,756,985 | A * | 5/1998 | Holste et al. | 235/475 |
| 7,789,542 | B2 * | 9/2010 | Lederer | 362/392 |
| 2002/0063035 | A1 | 5/2002 | Blad et al. | |
| 2003/0103228 | A1 * | 6/2003 | Imai | 358/1.14 |

(Continued)

FOREIGN PATENT DOCUMENTS

| | | | |
|---|---|---|---|
| DE | 3909637 | A1 | 10/1989 |
| EP | 0392731 | A2 | 10/1990 |

(Continued)

OTHER PUBLICATIONS

International Search Report (in English and German) and Written Opinion (in German) for PCT/EP2011/050463, mailed Jun. 14, 2011; ISA/EP.

(Continued)

*Primary Examiner* — Michael G Lee
*Assistant Examiner* — Tabitha Chedekel
(74) *Attorney, Agent, or Firm* — Harness, Dickey & Pierce, P.L.C.

(57) ABSTRACT

The invention relates to a system (10) for removing banknotes from at least one banknote transporting unit (12) and/or for feeding banknotes to the banknote transporting unit (12). The system (10) has a docking station (14) comprising a receiving area (16) secured by a safe for receiving the banknote transporting unit (12) and a control unit (28) for controlling the docking station (14).

22 Claims, 19 Drawing Sheets

(56) References Cited

U.S. PATENT DOCUMENTS

| | | | |
|---|---|---|---|
| 2004/0033832 | A1 | 2/2004 | Solomon |
| 2011/0031308 | A1 | 2/2011 | Holland-Letz et al. |
| 2011/0052363 | A1 | 3/2011 | Brexel et al. |

FOREIGN PATENT DOCUMENTS

| | | | |
|---|---|---|---|
| EP | 0692599 | A1 | 1/1996 |
| EP | 0718810 | A2 | 6/1996 |
| EP | 1376487 | A2 | 1/2004 |
| WO | WO-2009022955 | A1 | 2/2009 |
| WO | WO-2009127629 | A1 | 10/2009 |
| WO | WO-2009127648 | A2 | 10/2009 |

OTHER PUBLICATIONS

International Preliminary Report on Patentability for PCT/EP2011/050463 mailed Aug. 16, 2012 with English Translation (18 pages).

* cited by examiner

SYSTEM FOR FEEDING BANKNOTES TO A BANKNOTE TRANSPORTING UNIT WITH THE AID OF A DOCKING STATION

CROSS-REFERENCE TO RELATED APPLICATIONS

This application is a National Stage of International Application No. PCT/EP2011/050463, filed Jan. 14, 2011, and published in German as WO 2011/086158 A1 on Jul. 21, 2011. This application claims the benefit and priority of German Application No. 10 2010 004 669.8, filed Jan. 14, 2010. The entire disclosures of the above applications are incorporated herein by reference.

BACKGROUND

This section provides background information related to the present disclosure which is not necessarily prior art.

1. Technical Field

The invention relates to a system for removing banknotes from at least one banknote transporting unit and/or for feeding banknotes to the banknote transporting unit.

2. Discussion

In particular, the banknote transporting unit is a cash cassette, which is inserted into devices for handling banknotes, in particular into cash dispensers, automated points of sale and/or automated safes. The banknotes determined for the payout are stored in the cash cassette and/or the banknotes deposited are received in the cash cassette. If a rotational exchange is planned or if the cash cassette has reached a minimal fill level or a maximum fill level, the cash cassette is removed from the device by a cash-in-transit company so that the banknotes can be handled and is fed to a cash center, in which the cash cassette is emptied and/or refilled with banknotes. The cash cassette is emptied and/or filled manually at the cash center by members of service staff employed by the cash-in-transit company by opening a lid of the cash cassette and removing the banknotes and/or filling with new banknotes. The staff of the cash-in-transit company are not assisted by technical aids.

SUMMARY OF THE INVENTION

An object of the invention is to provide a system for removing banknotes from at least one banknote transporting unit and/or for feeding banknotes to the banknote transporting unit, the banknotes being removed and/or fed in a simple and effective manner.

In accordance with the invention, the system comprises a docking station, which has a receiving region, not secured by a safe, for receiving a banknote transporting unit, and a control unit for controlling the docking station. The docking station comprises a first transmitting and/or receiving unit for transmitting and/or receiving data, wherein this transmitting and/or receiving unit is connected to the data transfer unit via a data transfer element for transferring received data and/or data to be transmitted. The banknote transporting unit has a storage element for storing data and a second transmitting and/or receiving unit for transmitting and/or receiving data. In a first operating state, the banknote transporting unit is received in a receiving region of the docking station and a data transfer connection is formed between the two transmitting and/or receiving units, via which data can be transferred between the banknote transporting unit and the control unit. In a second operating state, the bank note transporting unit is arranged outside the receiving region of the docking station and no data transfer connection is formed between the two transmitting and receiving units.

Due to the provision of a docking station, a defined position of the banknote transporting unit is achieved, in which banknotes can be removed from and/or fed to the banknote transporting unit in a simple manner, either manually and/or automatically. Data can be transferred easily between the banknote transporting unit and the docking station due to the provision of the two transmitting and/or receiving units and of the data transfer connection existing therebetween in the first operating state. In particular, the storage element of the banknote transporting unit can thus be easily read out and/or new data can thus be easily written to the storage element of the banknote transporting unit.

In particular, the banknote transporting unit is a cash cassette, in which the banknotes are deposited in stacked form. The banknotes can thus be handled easily. In particular, the cash cassette is what is known as a “recycling cash cassette”, to which banknotes can be fed and from which banknotes can also be removed. Alternatively, the banknote transporting unit may also comprise a roll storage system. Furthermore, it is alternatively possible for the docking station to be formed in such a way that safe bags can also be received in its receiving region. In a particularly preferred embodiment of the invention, the receiving region of the docking station is formed in such a way that all transport containers, in particular cash cassettes, roll storage systems and safe bags, used for the transport of banknotes can be received in said receiving region.

In particular, the first transmitting and/or receiving unit comprises a first plug connector and the second transmitting and/or receiving unit comprises a second plug connector formed in a complementary manner to the first plug connector. In the first operating state, a plugged connection is produced between the two plug connectors, via which the data can be transferred. In particular, the first plug connector is the plug connector via which the banknote transporting unit is also connected to a cash dispenser or to another device for handling banknotes when inserted in the safe of the cash dispenser or of another device. A further transmitting and/or receiving unit therefore does not have to be provided to produce the data transfer connection between the control unit and the banknote transporting unit, and transmitting and/or receiving units already provided can instead be used. A relatively simple and cost-effective assembly is thus achieved. The data transfer connection between the banknote transporting unit and the control unit may also be formed in a wireless manner, either in addition to or as an alternative to the plug connectors. In particular, the banknote transporting unit may comprise an RFID chip.

In particular, the banknote transporting unit has a first opening, via which banknotes can be fed to and removed from the banknote transporting unit when the banknote transporting unit is inserted in a cash dispenser, an automated safe and/or an automated point of sale, and a second opening, which can be closed by a lid, for manually removing and/or for manually feeding banknotes. In particular, the second opening is arranged in the upper face of the banknote transporting unit so that the banknotes can be manually removed and fed again in a simple manner. Alternatively, the banknotes may also be removed and fed via the second opening with the aid of a robot rather than manually.

In particular, the banknote transporting unit comprises a sensor for detecting opening of the lid. If opening of the lid is detected by the sensor in the second operating state, manipulation data containing information regarding the fact that the lid has been opened without authorization are stored in the storage element. In particular, the manipulation data include a time stamp, which indicates the time at which the lid was opened without authorization in the second operating state. In the first operating state, the control unit transfers release data via the data transfer connection so that the lid can be opened for manual filling of the banknote transporting unit and/or for manual removal of the banknotes without manipulation data being stored in the storage element.

In the second operating state, that is to say when the banknote transporting unit has been removed, unauthorized opening of the lid and thus possible attempts to manipulate the banknote transporting unit can therefore be recorded and followed up as soon as possible. Due to the transfer of the release data, the lid can thus be opened in the cash center during the planned filling and/or emptying of the banknote transporting unit without manipulation data being stored erroneously in the storage element.

It is advantageous if the docking station comprises a stand area for positioning of the docking station and if the receiving region has a support area on which the banknote transporting unit rests in the first operating state, and if the stand area and the support area are arranged at an angle to one another between 10° and 60°, in particular 20°. Due to the angle between the stand area and the support area, in the case of a cash cassette, in which the banknotes are stacked, the banknotes cannot topple over when the lid is opened, and therefore the banknotes can be removed and fed manually in a simple manner.

In addition or as an alternative, the system may comprise a separating and/or stacking module for automatically feeding banknotes through the first opening and/or for removing the banknotes from the banknote transporting unit through the first opening. Banknotes can thus also be fed or removed automatically to/from the banknote transporting unit through the first opening, either in addition to or alternatively to the manual filling through the second opening. Due to such an automatic feeding and/or removal of banknotes, a member of service staff is therefore no longer required to remove and/or feed the banknotes, thus saving costs and reducing the error rate.

In particular, the first opening can be closed by a shutter, which is closed in the second operating state so that unauthorized access to the banknotes received in the banknote transporting unit is not possible, and which is open in the first operating state so that banknotes can be transported through the first opening. In particular, the banknote transporting unit comprises a sensor for detecting opening of the shutter, wherein, when the shutter is opened in the second operating state, manipulation data are stored in the storage element and, in the first operating state, the control unit transfers release data via the data transfer connection so that the shutter can be opened to fill the banknote transporting unit and/or to remove banknotes without manipulation data being stored in the storage element. Due to the transfer of the release data, no manipulation data are recorded during planned filling and emptying of the banknote cassette in the cash center, and manipulation data are instead only stored in the storage element in the event of unauthorized opening in the second operating state.

The manipulation data stored in the storage element, which indicate unauthorized opening of the first or second opening in the second operating state, are transferred in the first operating state to the control unit and are displayed to a member of service staff via a display unit. The member of service staff is thus informed of attempts to manipulate the banknote transporting unit and can check whether the actual banknote supply in the banknote transporting unit deviates from the should-be value, and any necessary corresponding inspections can be implemented. Once the manipulation data have been transferred from the storage element to the control unit, the manipulation data in the storage element are preferably deleted so that the manipulation data are not transferred again when the banknote transporting unit is next inserted into a docking station, thus preventing the same manipulation data from being followed up a number of times.

In the first operating state, the data transfer connection can also be used for transfer from the banknote transporting unit to the control unit of data containing information regarding the state of the banknote transporting unit, in particular data containing information regarding the supply of banknotes in the banknote transporting unit, data containing information regarding the serial numbers of the banknotes, data containing information regarding the sequence in which the banknotes have been deposited, data containing information regarding multiple withdrawals, maintenance data regarding transport elements of the banknote transporting unit and/or maintenance data of an inking kit of the banknote transporting unit, either in addition to or alternatively to the manipulation data. Due to the transfer of data containing information regarding multiple withdrawals, when a multiple withdrawal occurs, the supply of banknotes in the banknote transporting unit can thus be checked so that it is ensured that the actual supply also matches the should-be supply and there can be no errors in the paying out of banknotes. Due to the transfer of maintenance data, it is ensured that transport elements, a battery and/or an inking kit/spoilage unit are serviced at the correct time before any malfunctions can occur.

In particular, the banknote transporting unit comprises stops for defining the holding region of the banknote cassette for holding the banknotes, via which the holding region of the banknote cassette can be adapted to the size and therefore the denomination of received banknotes. In particular, these stops are adjustable in the first operating state so that the denomination received in the banknote transporting unit can be changed. If, in the first operating state, the position of the stops is changed, data containing information regarding the position of the stops and therefore data containing information regarding the denomination of the banknotes received in the banknote transporting unit are thus stored in the storage element of the banknote transporting unit with the aid of the control unit. If the banknote transporting unit is subsequently inserted into a cash dispenser, an automated point of sale system, an automated safe and/or another docking station, the denomination of banknotes received in the banknote transporting unit can thus be read out from the storage element.

It is also advantageous if data containing information regarding multiple withdrawals are stored in the storage element. In particular, these data contain information regarding whether and, if so, when and how often multiple withdrawals have occurred. A “multiple withdrawal” is understood to mean when two or more banknotes have accidentally been removed at the same time from the banknote transporting unit when said unit is inserted in a cash dispenser, an automated point of sale and/or an automated safe. Since, in the event of such a multiple withdrawal, it is not certain how many banknotes have been withdrawn, the supply of banknotes in the banknote transporting unit is also unknown. The data containing information regarding multiple withdrawals are transferred from the storage element to the control unit in the first operating state, wherein, according to these data, the control unit generates output data, which can be displayed via a display unit so that a member of service staff can be informed of the occurrence of the multiple withdrawals and can establish the current supply of the banknotes received in the banknote transporting unit by counting the banknotes and can compare this to the should-be state.

In particular, the control unit processes program data of a program to assist a member of service staff tasked with filling or emptying the banknote transporting container, wherein instructions are displayed to the member of service staff via a display unit during processing of the program data. The member of service staff is thus guided step-by-step when filling and/or emptying the banknote transporting unit, and therefore errors are prevented and the member of service staff knows at all times which step is to be carried out next. In particular, the display unit is a screen, preferably a touchscreen.

In particular, an instruction to open the lid, information regarding manipulation, information regarding a multiple withdrawal, an instruction to count the supply of banknotes received in the banknote transporting unit, a request to input the established supply of banknotes, an instruction regarding which banknotes are to be used to fill the banknote transporting container, and/or maintenance information can be displayed to the member of service staff via the display unit. In particular, the member of service staff is guided step-by-step, so that necessary steps are carried out in the correct sequence according to the information stored in the storage element.

In the first operating state, the banknote transporting unit can either be emptied completely and then refilled with banknotes, or alternatively only emptied in part or else not at all and filled with new banknotes. The effort and time required to fill the banknote transporting unit is reduced by refilling the banknote transporting unit without complete prior emptying of the banknote transporting unit, thus increasing the efficacy of the method.

In addition to the manipulation data and the data regarding information regarding multiple withdrawals, data containing information regarding the denomination of the received banknotes, data containing information regarding the serial numbers of the banknotes, data containing information regarding the sequence in which the banknotes have been deposited, data containing information regarding the number of received banknotes, data containing information regarding the serial number of the banknote transporting container, the serial number of a target device, the serial number of a source device and/or the serial number of the last docking station in which the banknote transporting unit was received, can also be stored in the storage element. In particular, the target device is the cash dispenser, the automated point of sale and/or the automated safe in which the banknote transporting unit is to be received next. In particular, the source device is the cash dispenser, the automated point of sale and/or the automated safe in which the banknote transporting unit was last received. All data necessary for the handling of the banknote transporting unit are thus stored in the storage element, and a docket arranged on the banknote transporting unit and containing this data can thus be omitted. Due to the storage of the data on a storage element, the data can be handled electronically and cannot be lost so easily as compared to the docket.

It is also advantageous if electrical energy for supplying electrical consumers of the banknote transporting unit can also be transferred via the plugged connection, in addition to the data. An additional connection for the transfer of electrical data can thus be omitted.

In a particularly preferred embodiment of the invention, the system comprises a separating and/or stacking module for automatically feeding banknotes and/or for removing banknotes from the banknote transporting unit and an intermediate store, from which banknotes can be removed and fed to the banknote transporting unit and/or to which banknotes removed from the banknote transporting unit can be fed. Banknotes can thus easily be removed automatically from the banknote transporting unit, without any manual intervention, and new banknotes can be fed. Due to the intermediate store, it is ensured that the banknotes required for the filling process are at all times available and that storage space is available for banknotes removed from the banknote transporting unit.

It is also advantageous if the system comprises a counting device for establishing the supply of banknotes in the banknote transporting unit. The banknotes to be counted are automatically removed from the banknote transporting unit, in particular with the aid of the separating and/or stacking module, and fed to the counting device via a transport path so that the supply of banknotes can be established automatically by the counting device. Once the supply has been established, the number of banknotes is transferred in particular to the control unit, wherein the control unit compares the established supply with a should-be supply stored in the storage element of the banknote transporting unit.

It is particularly advantageous if the control unit controls the separating and/or stacking module according to manipulation data and/or data containing information regarding multiple withdrawals stored in the storage element, in such a way that the separating and/or stacking module removes all banknotes received in the banknote transporting unit and feeds them to the target device. It is also advantageous if the target device transfers data containing information regarding the number of banknotes to the control unit. In the event of a multiple withdrawal, the actual supply of banknotes in the banknote transporting unit can thus be compared automatically to the should-be supply, and any discrepancies can be established.

It is also advantageous if an input and/or output unit for feeding banknotes to the system and/or for removing banknotes from the system is provided. Banknotes which are no longer to remain in the banknote cycle, in particular damaged and/or suspected counterfeit banknotes as well as banknotes of high denomination can thus be removed from the banknote cycle and new banknotes can be fed to the banknote cycle.

In particular, the input and output unit is formed in such a way that both cash cassettes and safe bags can be received in a receiving region. With the aid of the system, both purely depositing banknote transporting containers and also recycling banknote transporting containers can thus be handled and can be filled and emptied in a banknote cycle. "Depositing banknote transporting containers" are understood to mean banknote transporting containers which are exclusively filled with banknotes in a device for issuing banknotes, and which, once filled with the banknotes, only have to be emptied and do not have to be refilled. By contrast, "recycling banknote transporting containers" are refilled with banknotes once empty, and/or, when received in a device for handling banknotes, can receive and also issue banknotes. In particular, only one banknote cycle is thus necessary and effective cash-cycle management is thus achieved.

In a particularly preferred embodiment of the invention, the system comprises a plurality of docking stations and a plurality of separating and/or stacking modules, wherein a separating and/or stacking module is assigned to each docking station and is used to feed and to remove banknotes to/from a banknote transporting unit received in a docking station. By means of the separating and stacking modules, banknotes can be fed and/or removed, in particular simultaneously, to/from banknote transporting units received in the docking stations. A greater number of banknote transporting units can thus be emptied and/or filled per unit of time. In particular, the removed banknotes or the banknotes required for filling are removed from or fed to a single, central intermediate store respectively, and therefore very effective cash-cycle management is achieved on the whole.

BRIEF DESCRIPTION OF THE DRAWINGS

The drawings described herein are for illustrative purposes only of selected embodiments and not all possible implementations, and are not intended to limit the scope of the present disclosure.

Further features and advantages of the invention will emerge from the following description, which explains the invention in greater detail on the basis of exemplary embodiments in conjunction with the accompanying figures, in which.

Corresponding reference numerals indicate corresponding parts throughout the several views of the drawings.

DETAILED DESCRIPTION OF THE PREFERRED EMBODIMENTS

Example embodiments will now be described more fully with reference to the accompanying drawings.

Figure 1:
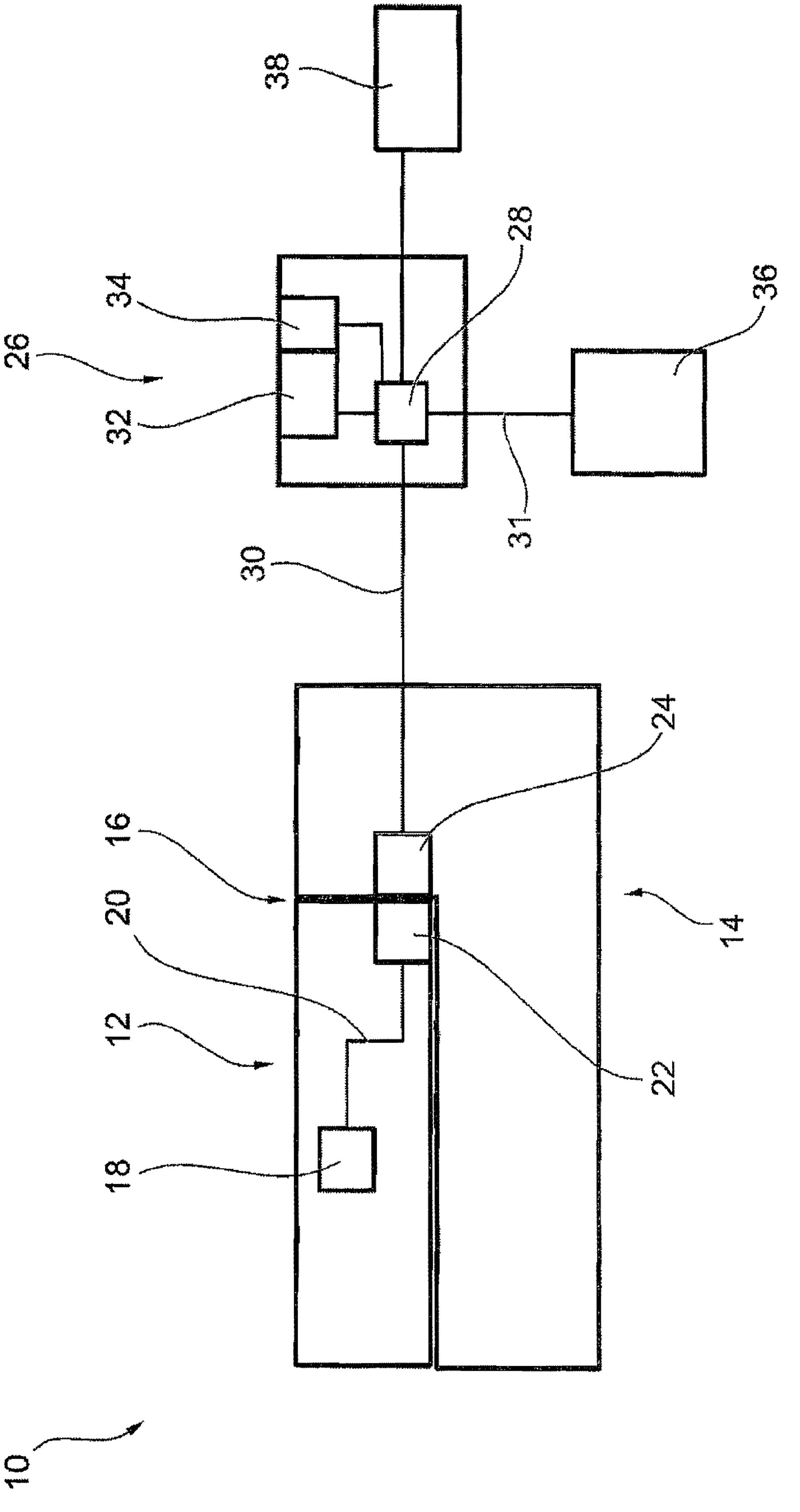
FIG. 1 shows a schematic illustration of a system for removing banknotes from a banknote transporting unit and for feeding banknotes to the banknote transporting unit in accordance with a first embodiment of the invention.

FIG. 1 presents a schematic illustration of a system 10 for removing banknotes from a banknote transporting unit formed as a cash cassette 12 and/or for feeding banknotes to the cash cassette 12. The banknotes are deposited in the cash cassette 12, in particular in stacked form, in one or more compartments. Alternatively, the cash cassette 12 may also comprise a roll storage system for storing the banknotes. In an alternative embodiment of the invention, a safe bag can be provided in addition or alternatively, from which the banknotes are removed.

The system 10 comprises a docking station 14, which has a receiving region 16, in which the cash cassette 12 is received in the operating state shown in FIG. 1 and is thus docked on the docking station 14. The operating state shown in FIG. 1 is therefore also referred to as the docked operating state. In an undocked operating state, the cash cassette 12 is separated from the docking station 14 and therefore is not received in the receiving region 16.

The cash cassette 12 comprises a storage element 18, in which logistical information relevant to the handling of the cash cassette 12 are stored. In particular, data containing information regarding the denomination of the banknotes in the cash cassette 12, the number of banknotes, information regarding any attempts to manipulate the cash cassette, information regarding any multiple withdrawals, maintenance data for the cash cassette 12, a cash cassette ID, the target device for which the cash cassette 12 is intended, a serial number of the last docking station 16 in which the cash cassette 12 was received and/or a serial number of the last device in which the cash cassette 12 was received are stored in the storage element 18. The storage element 18 is connected via a data connection 20 to a first plug connector 22, which is engaged in the docked operating state shown in FIG. 1 with a complementary second plug connector 24 of the docking station 14 so that a plugged connection is formed between the plug connectors 22, 24, via which data can be transferred. In an alternative embodiment of the invention, other transmitting and/or receiving units can be provided instead of plug connectors 22, 24. In particular, both the cash cassette 12 and the docking station 14 may have a transmitting and/or receiving unit for wirelessly transmitting and/or receiving data. In particular, the cash cassette 12 may comprise an RFID chip.

Due to the fact that the cash cassette 12 is received in the receiving region 16 of the docking station 14, a defined position of the cash cassette 12 is thus ensured, and data can also be transferred via the plugged connection formed between the plug connectors 22, 24. In the undocked state, there is no plugged connection between the plug connectors 22, 24, and therefore data cannot be transferred.

The system 10 further comprises a data processing unit 26, which in turn comprises a control unit 28, which is connected via a data transfer element 30 to the second plug connector 24 so that data can be transferred between the storage element 18 of the control unit 28 via the plugged connection formed via the plug connectors 22, 24. The control unit 28 is used to control the docking station 14. In particular, the data processing unit 26 is a computer.

The cash cassette 12 comprises a first opening (not illustrated) and a second opening (likewise not illustrated), wherein the second opening can be closed by a lid and is used for manual removal and for manual feeding of banknotes. The first opening can be closed via a shutter and is used to remove and to feed banknotes when the cash cassette 12 is inserted in a cash dispenser, an automated point of sale and/or an automated safe. In an undocked state, both the lid and the shutter are locked so that unauthorized access to banknotes received in the cash cassette 12 is not possible or is impaired. Both the lid and the shutter are secured by a sensor, which, in the undocked state, detects opening of the lid and/or of the shutter and, in such an event, stores manipulation data containing information regarding the manipulation, in particular information regarding the time, in the storage element 18. In particular, the undocked state is the state in which the cash cassette 12 is transported between different cash dispensers, automated points of sale, automated safes and/or a cash center for filling and/or emptying of the cash cassette 12. In particular, the system 10 is arranged in a cash center, wherein, in the docked state, banknotes are removed from and/or banknotes are fed to the cash cassette 12. In particular, the cash cassette 12 is emptied completely and refilled in a planned manner. Alternatively, only some of the banknotes arranged in the cash cassette 12 may be removed and the cash cassette 12 may merely be filled up. It is also possible for no banknotes to be removed from the cash cassette 12 and for merely additional banknotes to be fed.

Once the cash cassette 12 has been inserted into the receiving region 16 of the docking station and the plugged connection has been produced between the first plug connector 22 and the second plug connector 24, release data are transferred to the cash cassette 12 from the control unit 28 via the plugged connection so that the lid of the second opening can be opened, without manipulation data being stored in the storage element 18. In particular, an inking kit possibly provided in the cash cassette 12 is deactivated with the aid of this release data, said inking kit being activated upon unauthorized opening of the cash cassette 12 and making the banknotes received in the cash cassette 12 unusable as a result of staining. The lid of the cash cassette 12 can thus be opened without the alerting of unauthorized access, and therefore banknotes can be removed from the cash cassette 12 and new banknotes can be fed to the cash cassette 12. In particular, banknotes are removed and the cash cassette 12 is filled with new banknotes by a member of service staff of a cash-in-transit company. Alternatively, the system 10 may also comprise a robot, which removes and/or feeds the banknotes via the second opening.

Once the cash cassette 12 has been inserted into the docking station 14, the data stored in the storage element 18 are read out and transferred to the control unit 28. In addition to any manipulation data, multiple withdrawal data, inter alia, are also transferred and indicate whether a multiple withdrawal has occurred during operation of the cash cassette 12 since the last emptying and filling operation in a docking station 14. In this case, a “multiple withdrawal” is understood to mean when a plurality of banknotes has been withdrawn at the same time from the cash cassette 12 during operation in a cash dispenser. Such a multiple withdrawal results in the fact that the supply of banknotes stored in the storage element 18 may no longer be correct if the number of banknotes actually withdrawn cannot be determined. Should the readout of the storage element 18 show that a multiple withdrawal and/or an attempt to manipulate the cash cassette has occurred, the control unit 28 transfers this information to a display unit 32, which displays corresponding information to the member of service staff of the cash-in-transit company so that he/she can deal with this accordingly. In particular, the display unit 32 is a screen, via which the corresponding information is displayed to the member of staff. The data processing unit 26 further comprises an input unit 34, via which the member of service staff can input information into the data processing unit 26. In particular, the display unit 32 and the input unit 34 are formed in one piece, preferably in the form of a touch-screen.

The supply of banknotes in the cash cassette 12 is also read out from the storage element 18. In addition, maintenance data can be read out and displayed to the member of service staff via the display unit 32 so that, where necessary, he/she can initiate the steps necessary for servicing.

Should there be an attempt to manipulate the cash cassette and/or a multiple withdrawal, the member of service staff thus removes all banknotes located in the cash cassette 12 and feeds them to a counting device 36, which establishes the supply of banknotes. In particular, the counting device 36 is connected to the control unit 28 via a data transfer element 31 and transfers the established actual supply of banknotes to the control unit 28, which compares the actual supply with the should-be supply stored in the storage element 18. Alternatively, the counting device 36 may also comprise a display unit and may display the actual supply of banknotes to the member of service staff, who in turn inputs the actual supply into the data processing unit 26 via the input unit 34 so that the actual supply can be compared with the should-be supply in the control unit 28. Should there be a discrepancy between the actual supply and the should-be supply, the member of service staff actions an investigation order, of which the objective is to establish the origin of this discrepancy. This investigation order may also be actioned automatically by the control unit 28, either in addition or alternatively.

The control unit 28 is further connected to a central server 38, or what is known as a “cash management server”. The banknote supplies are thus managed via the cash management server 38 in a cash cycle management arrangement, which includes the system 10. In particular, the banknote supplies of cash dispensers and cash cassettes are managed via the cash management server and the filling and emptying intervals are optimized in accordance with various parameters. Data are transferred from the cash management server 38 to the control unit 28, said data containing information regarding the number of banknotes and the denomination with which the cash cassette 12 is to be filled. The control unit 28 outputs corresponding information to the member of service staff via the display unit 32 so that he/she knows which banknotes he/she is to feed to the cash cassette 12. In particular, order-based filling of the cash cassette 12 is enabled by the cash management server, that is to say the cash cassette 12 may also only be filled in part where necessary.

Depending on which denomination of banknotes were received previously in the cash cassette 12, it may be necessary for stops in the holding region of the cash cassette 12 to be adjusted and adapted to the denomination of the newly received banknotes. Once the position of the stops has been changed, the member of service staff inputs this information via the input unit 34 and the control unit 28 stores the data containing the information regarding the received denomination of the banknotes and the number of fed banknotes in the storage element 18 of the cash cassette 12. Once the cash cassette 12 has been filled with banknotes as planned, the member of service staff closes the lid and confirms the filling of the cash cassette 12 via a corresponding input via the input unit 34. The cash cassette 12 can then be removed from the docking station 14 and fed to a cash dispenser, an automated point of sale and/or an automated safe.

During the above-described removal and/or filling of the cash cassette 12 with banknotes, the control unit 28 in particular processes program data of a program for assisting the member of service staff when filling and emptying the cash cassette 12. The individual steps implemented during this procedure will be described in greater detail hereinafter in conjunction with FIGS. 3 to 9.

Figure 2:
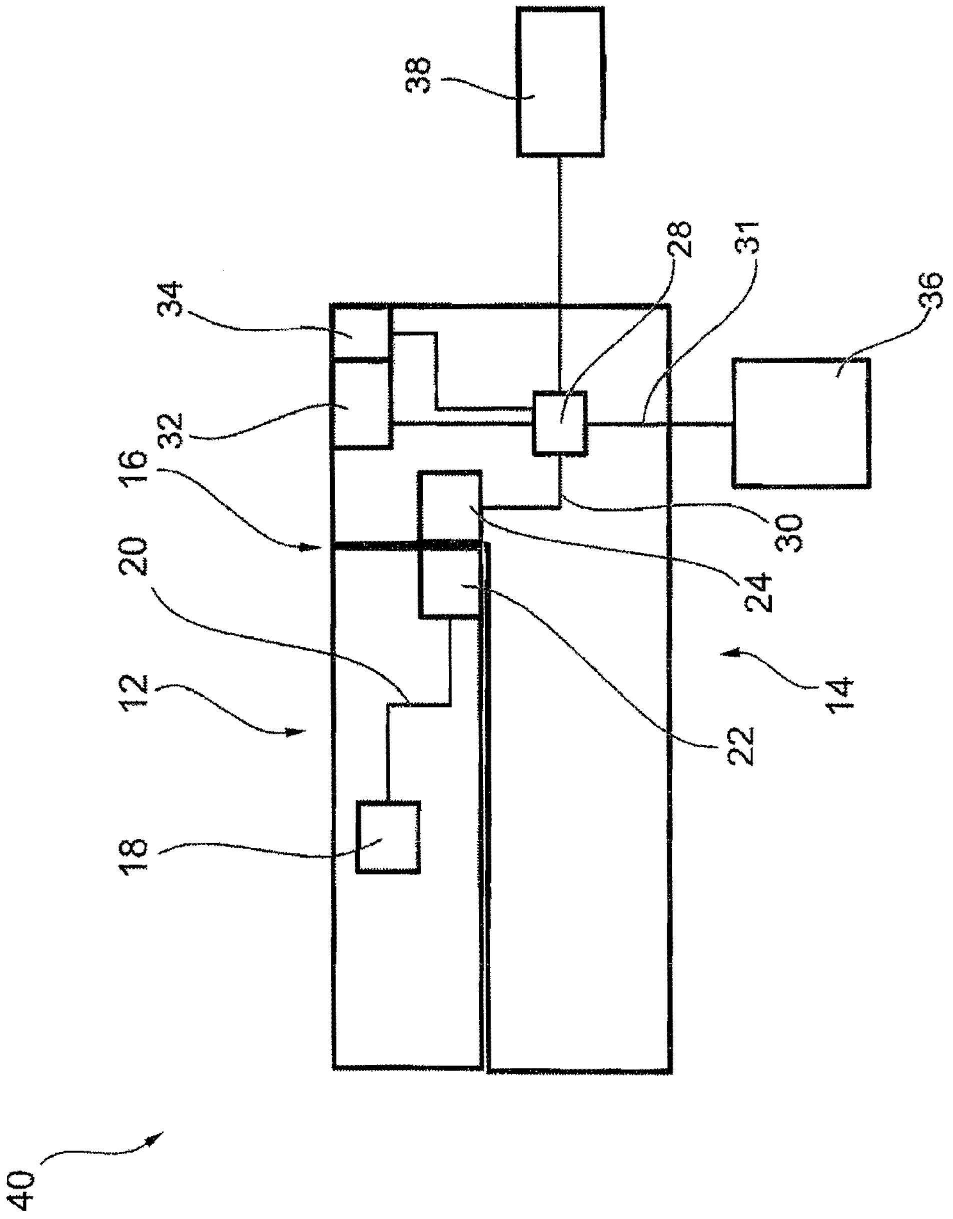
FIG. 2 shows a schematic illustration of a system for removing and for feeding banknotes from/to a banknote transporting unit in accordance with a second embodiment of the invention.

FIG. 2 shows a schematic illustration of a system 40 for feeding banknotes to a cash cassette 12 or for removing banknotes from the cash cassette 12 in accordance with a second embodiment of the invention. Elements of like assembly or like function are denoted by like reference signs. In contrast to the first exemplary embodiment shown in FIG. 1, there is no separate data processing unit 26, in particular no computer, in the system 40, and the control unit 28, the display unit 32 and the input unit 34 are instead components of the docking station 14. A simple and compact assembly of the system 40 is thus achieved.

Figure 3:
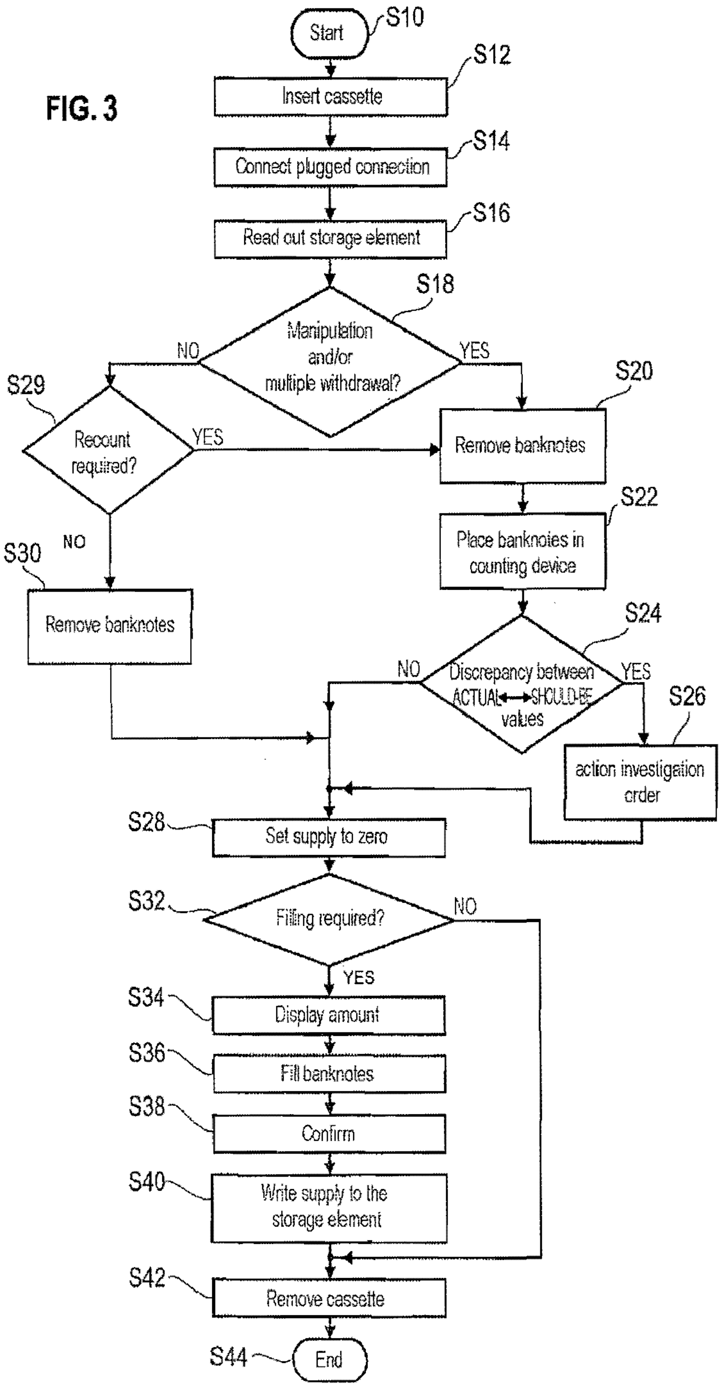
FIG. 3 shows a flow diagram of manual emptying and filling of the banknote transporting unit.
Figure 4:
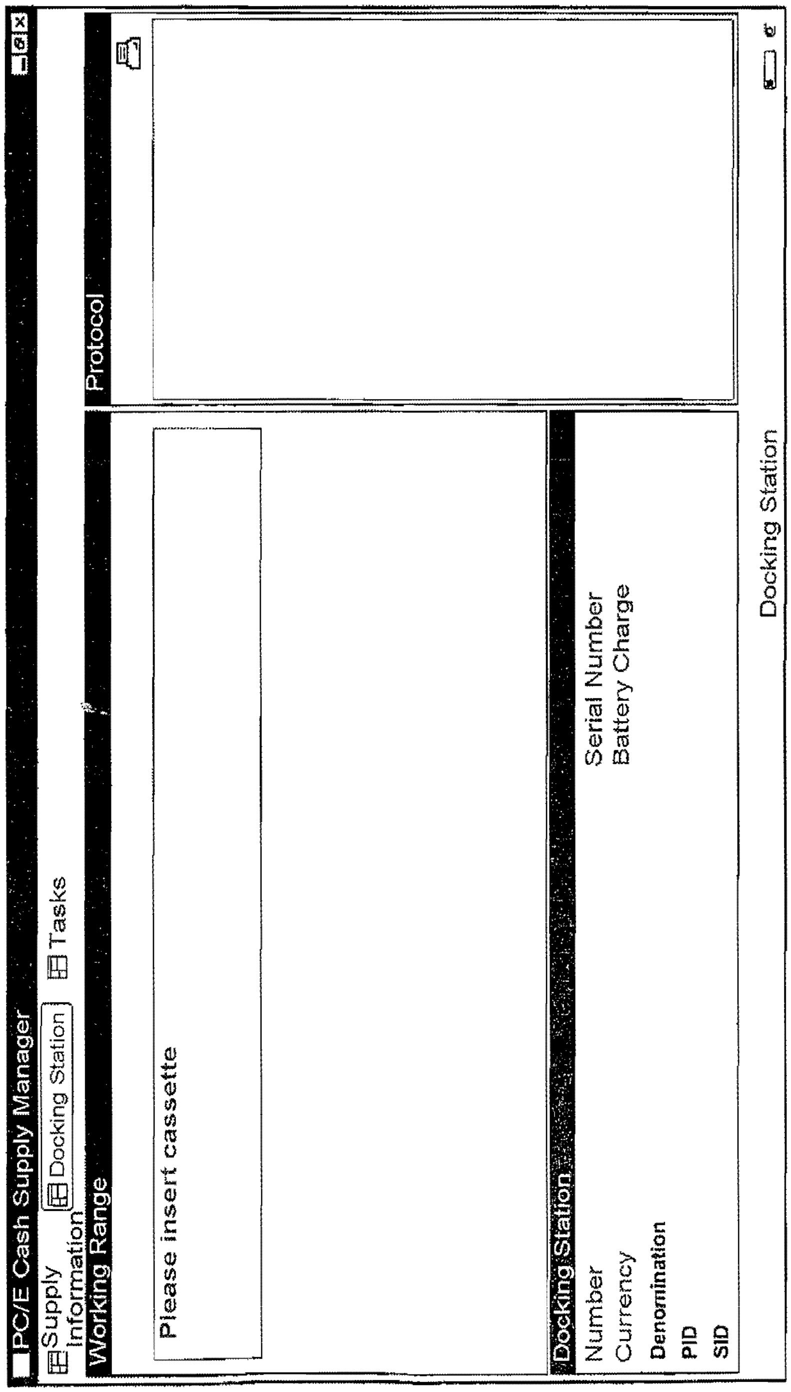
FIG. 4 shows an illustration of a first instruction output with the aid of a display unit.

FIG. 3 illustrates a flow diagram of a method for removing banknotes from a cash cassette 12 and for filling the cash cassette 12 with other banknotes. The process is started in step S10. In step S12, the cash cassette 12 is inserted into the receiving region 16 of the docking station 14, and then the plugged connection between the first plug connector 22 and the second plug connector 24 is produced in step S14. In particular, the receiving region 16 of the docking station 14 is formed in such a way that the plugged connection between the plug connectors 22, 24 is automatically produced when the cash cassette 12 is inserted into the receiving region 16.

Once the plugged connection has been produced, the data stored in the storage element 18 are read out in step S16 and transferred to the control unit 28 via the plugged connection. In step S18, the control unit 28 then establishes on the basis of the read-out data whether manipulation and/or a multiple withdrawal has occurred since the last time the cash cassette 12 was filled and/or emptied at the docking station 14. If an attempt to manipulate the cash cassette and/or a multiple withdrawal has occurred, the banknotes are then removed from the cash cassette 12 in step S20 and subsequently fed to a counting device 36 in step S22, in which the actual supply of banknotes is established. The established actual supply is then transferred to the control unit 28 and compared with the should-be supply stored in the storage element 18 and read out in step S16. If this comparison in step S24 reveals a discrepancy between the actual supply and the should-be supply, an investigation order is actioned in step S26, of which the objective is to establish what type of manipulation has occurred and/or why a multiple withdrawal has occurred. In step S28, the supply of banknotes in the cash cassette 12 stored in the storage element 18 is then set to zero.

If, in step S24, the comparison between the actual supply and the should-be supply does not reveal a discrepancy, step S28 then follows directly and the supply in the storage element 18 is set to zero.

If, in step S18, the evaluation of the data read out in step S16 reveals that there has been no manipulation and that there have been no multiple withdrawals, it is checked in step S29 whether or not a recount is still required. In particular, a corresponding request is displayed via the display unit 32 for this purpose, wherein the member of service staff has to input via the input unit 34 whether or not a recount is to be carried out. If a recount is required, step S20 is then implemented. If a recount is not required, the banknotes are removed in step S30 before step S28 is implemented and without a prior recount of the supply, and the supply of banknotes stored in the storage element 18 is set to zero.

Once the cash cassette 12 has then been emptied completely and the supply stored in the storage element 18 has been set to zero, it is established in step S32 whether filling of the cash cassette 12 is required. In particular, the control unit 28 thus evaluates data transferred from the cash management server 38 and containing information regarding the required filling of the cash cassette 12. If refilling of the cash cassette 12 is required, the number and denomination of banknotes to be fed to the cash cassette 12 are displayed in step S34. Once the member of service staff has fed the required number of banknotes to the cash cassette 12 in step S36 and has closed the lid of the second opening, the member of service staff inputs confirmation via the input unit 34 in step S38, whereupon the control unit 28 stores the new supply of banknotes in the storage element 18 in step S40. In step S42, the cash cassette is then removed from the docking station 14 and the plugged connection between the plug connectors 22, 24 is separated.

By contrast, if it is established in step S32 that refilling is not required, step S42 then follows directly, and the cash cassette 12 is removed from the docking station 14.

Once the cash cassette 12 has been removed in step S42, the method is terminated with step S44. The cash cassette 12 can then be fed to the intended cash dispenser, the intended automated safe and/or the intended automated point of sale.

In an alternative method for filling and emptying a cash cassette 12, the banknotes can also be fed to the cash cassette 12 without the prior removal of all banknotes. Only if there has been a multiple withdrawal and/or an attempt to manipulate the cash cassette is it absolutely necessary to remove all banknotes from the cash cassette so as to thus establish the current supply.

Illustrations of instructions displayed to the member of service staff via the display unit 32 are illustrated in FIGS. 4 to 9 and assist the member of service staff when emptying and filling the cash cassette 12 and guide him/her step-by-step so that the likelihood of errors is reduced. The member of service staff is prompted by the display shown in FIG. 4 to insert a cash cassette 12 into the receiving region 16 of the docking station 14.

Figure 5:
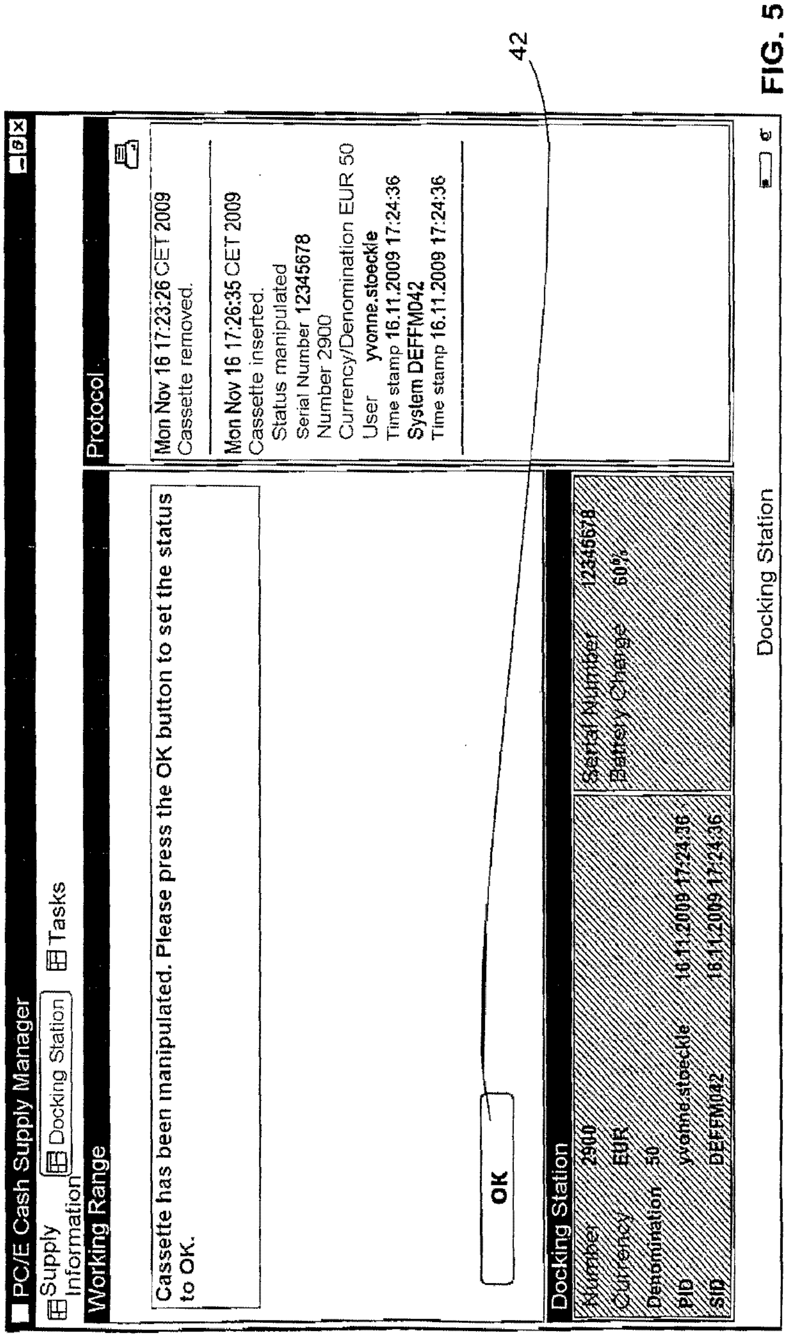
FIG. 5 shows an illustration of a second instruction output with the aid of a display unit.

The member of service staff is informed by the display illustrated in FIG. 5 that the storage element 18 in the cash cassette 12 has been read out, and that an attempt has been made to manipulate the cash cassette 12 since the last time said cash cassette 12 was inserted into a docking station 14. Furthermore, the member of service staff is requested to confirm the continuance of the method by actuating an OK button 42 displayed on a touchscreen. Alternatively, the button may also be activated by a pointing device, such as a computer mouse, or an external keyboard.

Figure 6:
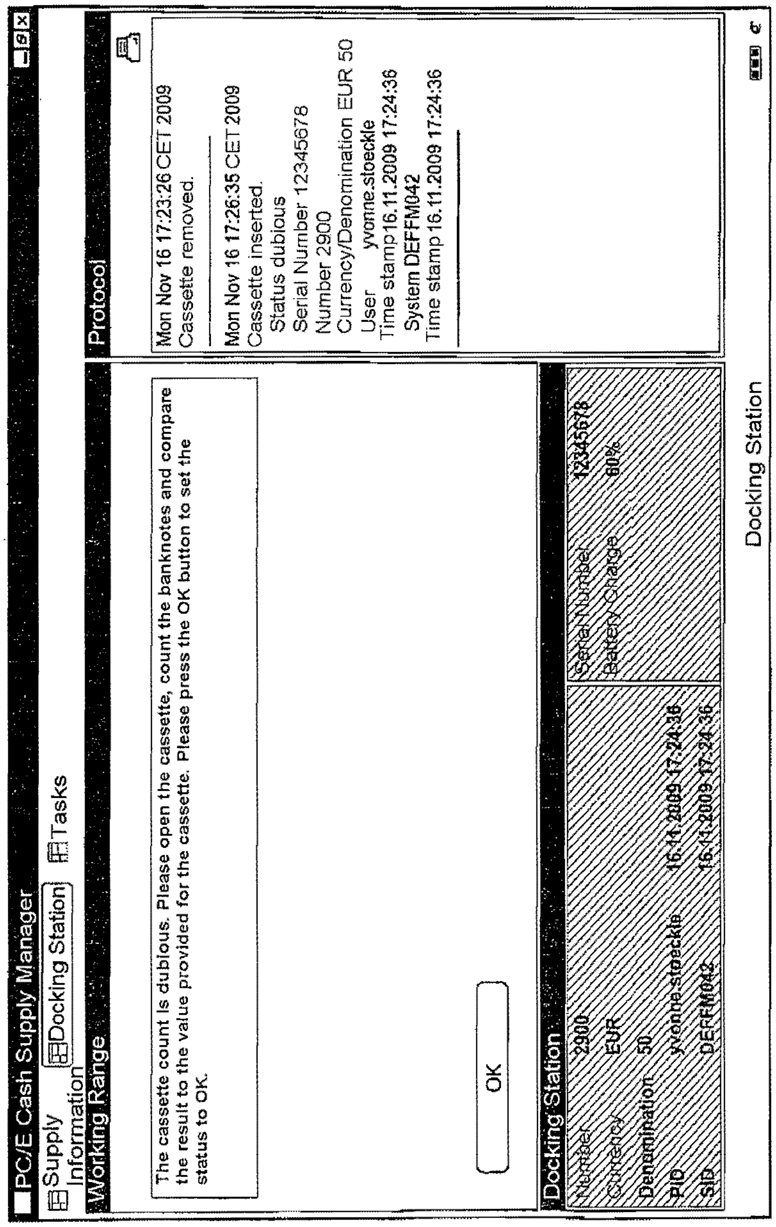
FIG. 6 shows an illustration of a third instruction output with the aid of a display unit.

The member of service staff is informed by the display illustrated in FIG. 6 that the supply of banknotes in the cash cassette 12 is uncertain. This may be the case if the readout of the storage element 18 has revealed that an attempt to manipulate the cash cassette and/or a multiple withdrawal has occurred. The member of service staff is therefore prompted to open the lid of the cash cassette 12 and to count the banknotes so as to establish the actual supply and to compare the established actual supply with the should-be supply.

Figure 7:
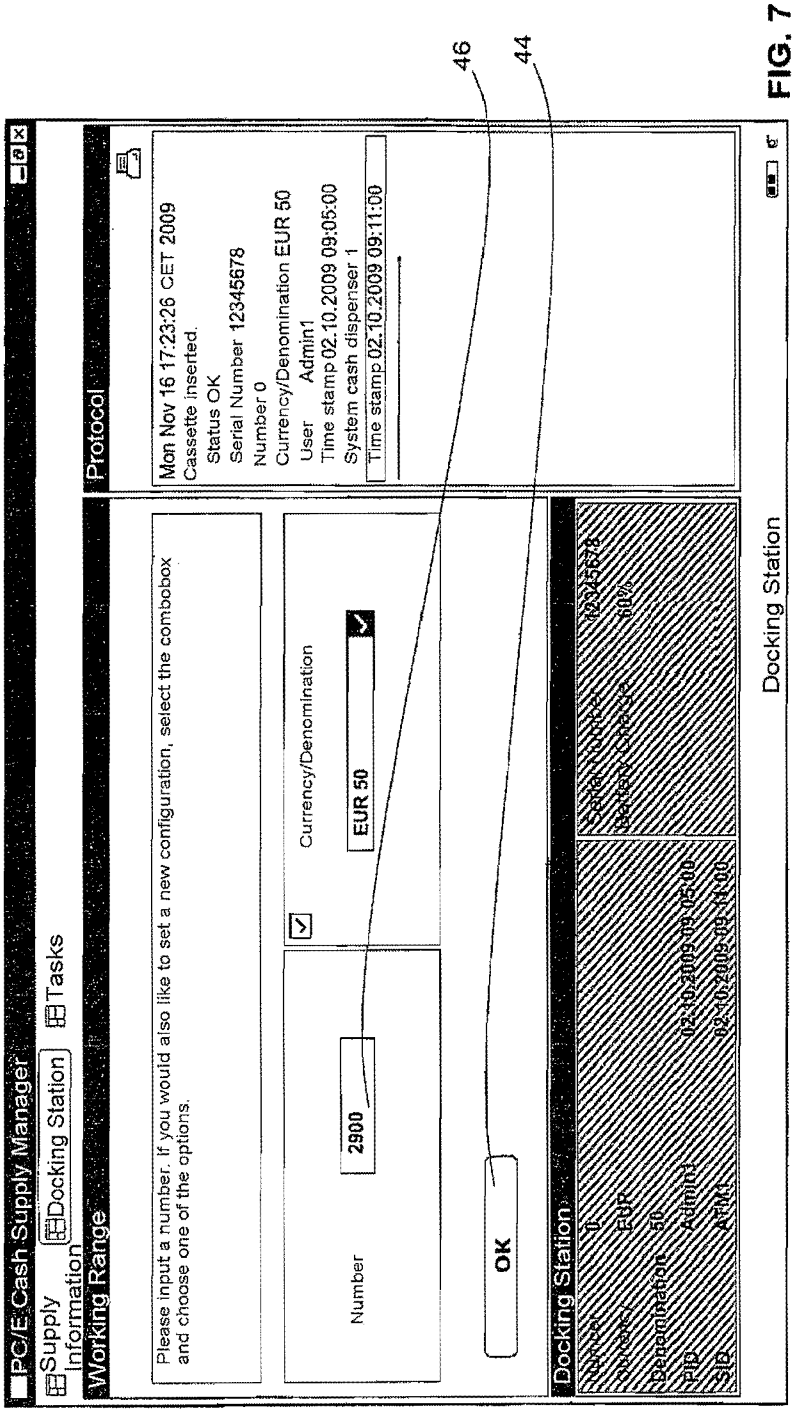
FIG. 7 shows an illustration of a fourth instruction output with the aid of a display unit.

By means of the display shown in FIG. 7, the member of service staff can input via the field 46 how many banknotes of which denomination he/she has fed to the cash cassette 12 so that the control unit 28 can store data containing corresponding information in the storage element 18 once the inputs have been confirmed by means of the OK button 44.

Figure 8:
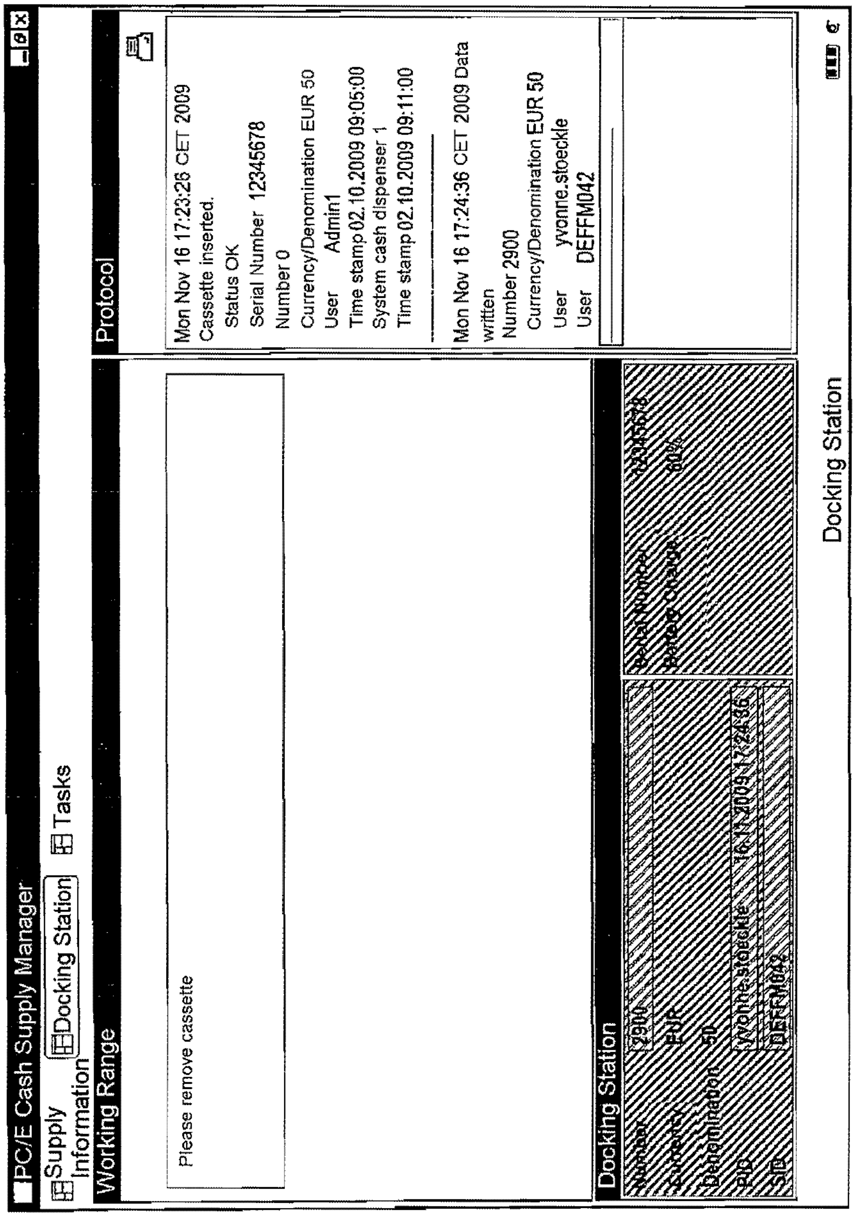
FIG. 8 shows an illustration of a fifth instruction output with the aid of a display unit.
Figure 9:
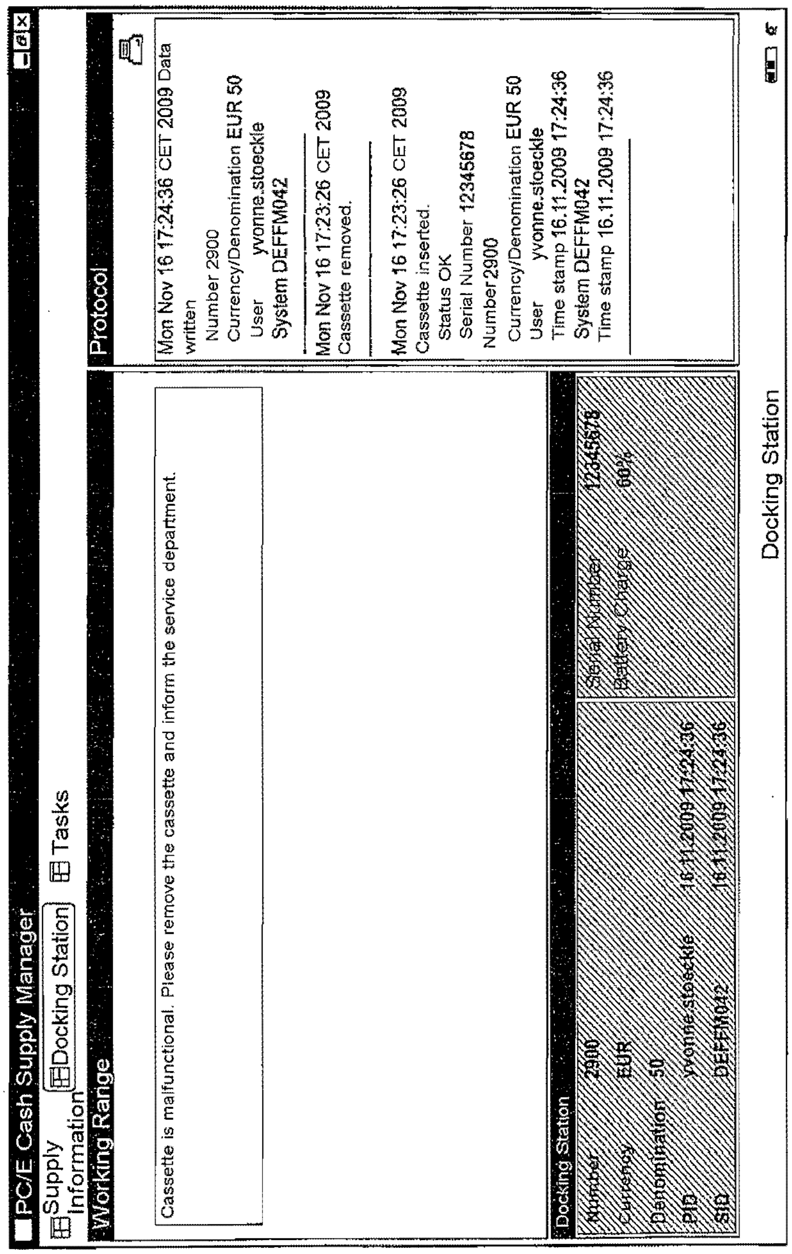
FIG. 9 shows an illustration of a sixth instruction output with the aid of a display unit.

The member of service staff is prompted by the display shown in FIG. 8 to remove the cash cassette 12 from the docking station 14. The member of service staff is informed by the display illustrated in FIG. 9 that the cash cassette 12 is not functional and is requested to remove the cash cassette 12 and to inform an appropriate engineer.

The displays shown in FIGS. 4 to 9 are merely exemplary and are used to illustrate the program with which the member of service staff is guided step-by-step by the processing of the program data by the control unit 28 during the filling and emptying processes. Both the visual design of the display and the contents of the displayed information may be different from those shown in FIGS. 4 to 9.

Figure 10:
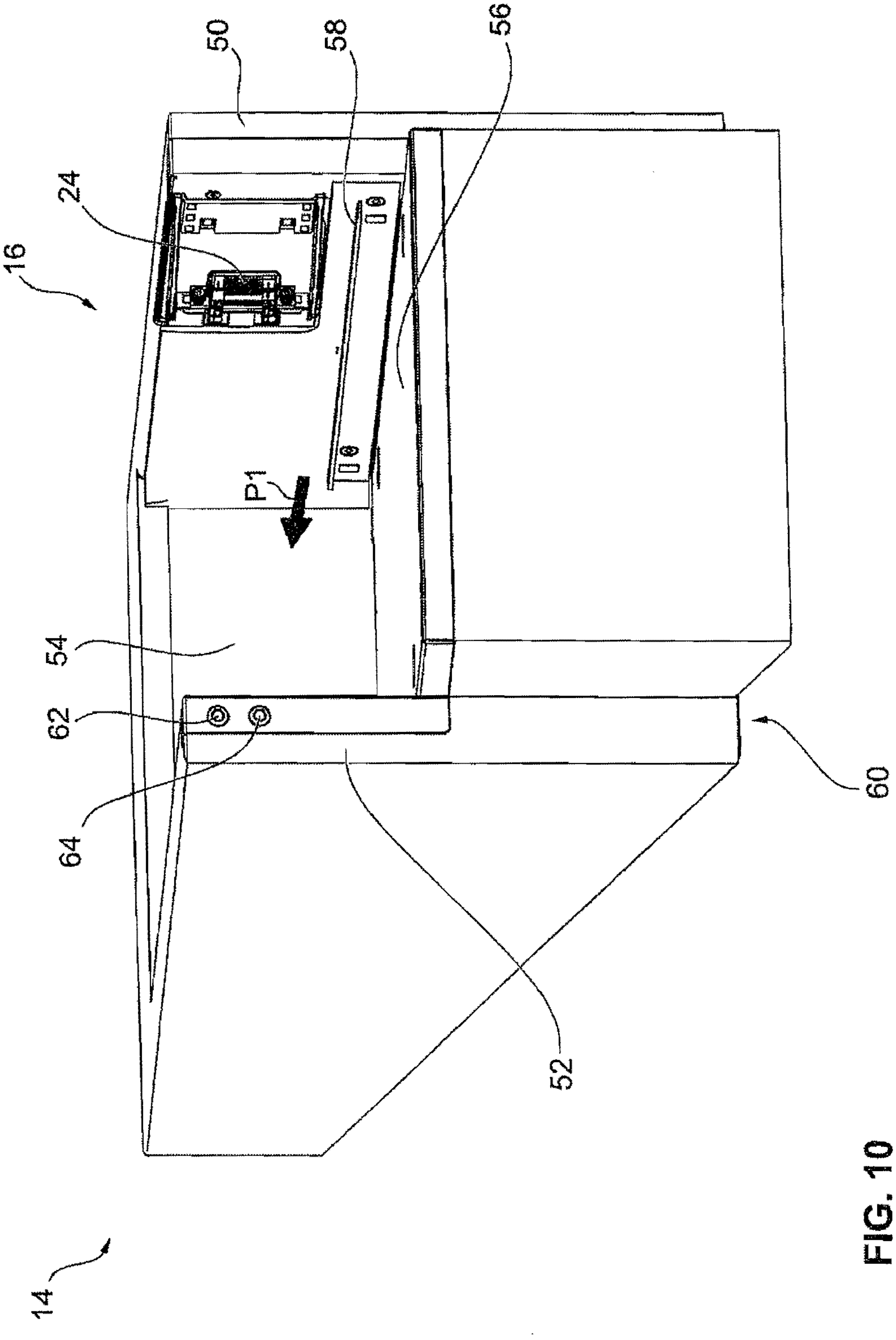
FIG. 10 shows a schematic perspective illustration of a docking station.

A schematic perspective illustration of a docking station 14 is shown in FIG. 10. The receiving region 16 of the docking station 14 is defined by three wall elements 50 to 54 and by a support area 56. The cash cassette 12 (not shown in FIG. 10) is introduced into the receiving region 16 in the direction of the arrow P1, wherein the cash cassette 12 rests on the support area 56 in the docked state. Furthermore, the cash cassette 12 is guided by rails arranged laterally on the wall elements 50, 52, one of said rails being denoted by reference sign 58 by way of example. When the cash cassette 12 is introduced into the receiving region 16, a plugged connection is automatically produced between the plug connector 22 of the cash cassette 12 and the plug connector 24 of the docking station 14.

The docking station 14 further comprises a stand area 60, on which the docking station 14 is positioned. The support area 56 and the stand area 60 are preferably arranged at an angle to one another in a range between 10° and 60°. Due to this angled support area 56, banknotes stacked in the cash cassette 12 received in the docking station 14 cannot topple over when the lid is opened, but remain in stacked form in the cash cassette 12. Removal of the banknotes is thus simplified. In particular, if banknotes are merely to be fed to the cash cassette 12 without removal of banknotes received beforehand, this is thus also possible without difficulty, without the receipt of new banknotes being impaired by the fact that banknotes already received have toppled over.

The docking station 14 further comprises a red LED 62 and a green LED 64, wherein the red LED 62 lights up when the readout of the data stored in the storage element 18 reveals that there has been an attempt to manipulate the cash cassette, and the green LED 64 lights up if there have been no attempts to manipulate the cash cassette.

Figure 11:
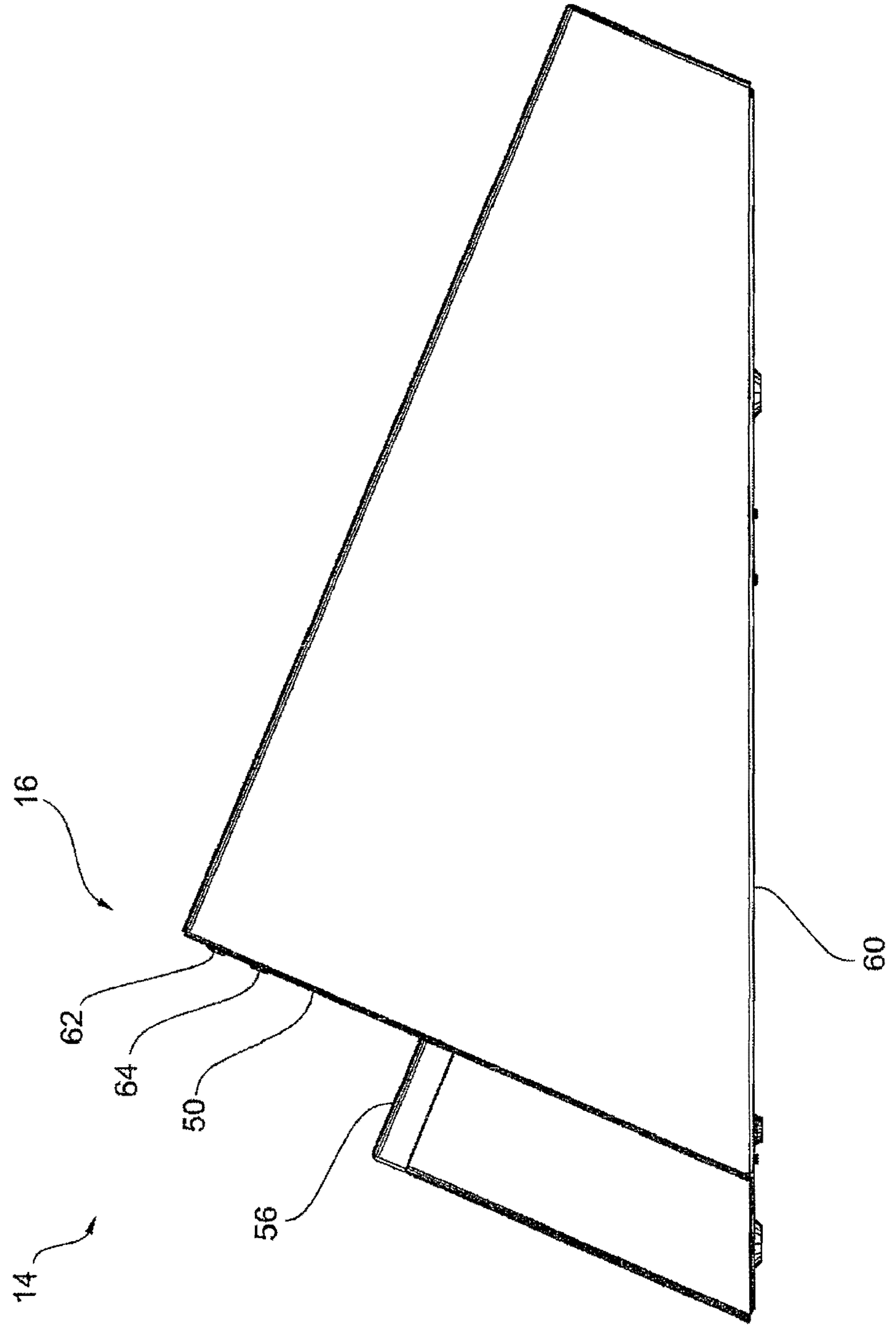
FIG. 11 shows a side view of the docking station according to FIG. 10.
Figure 12:
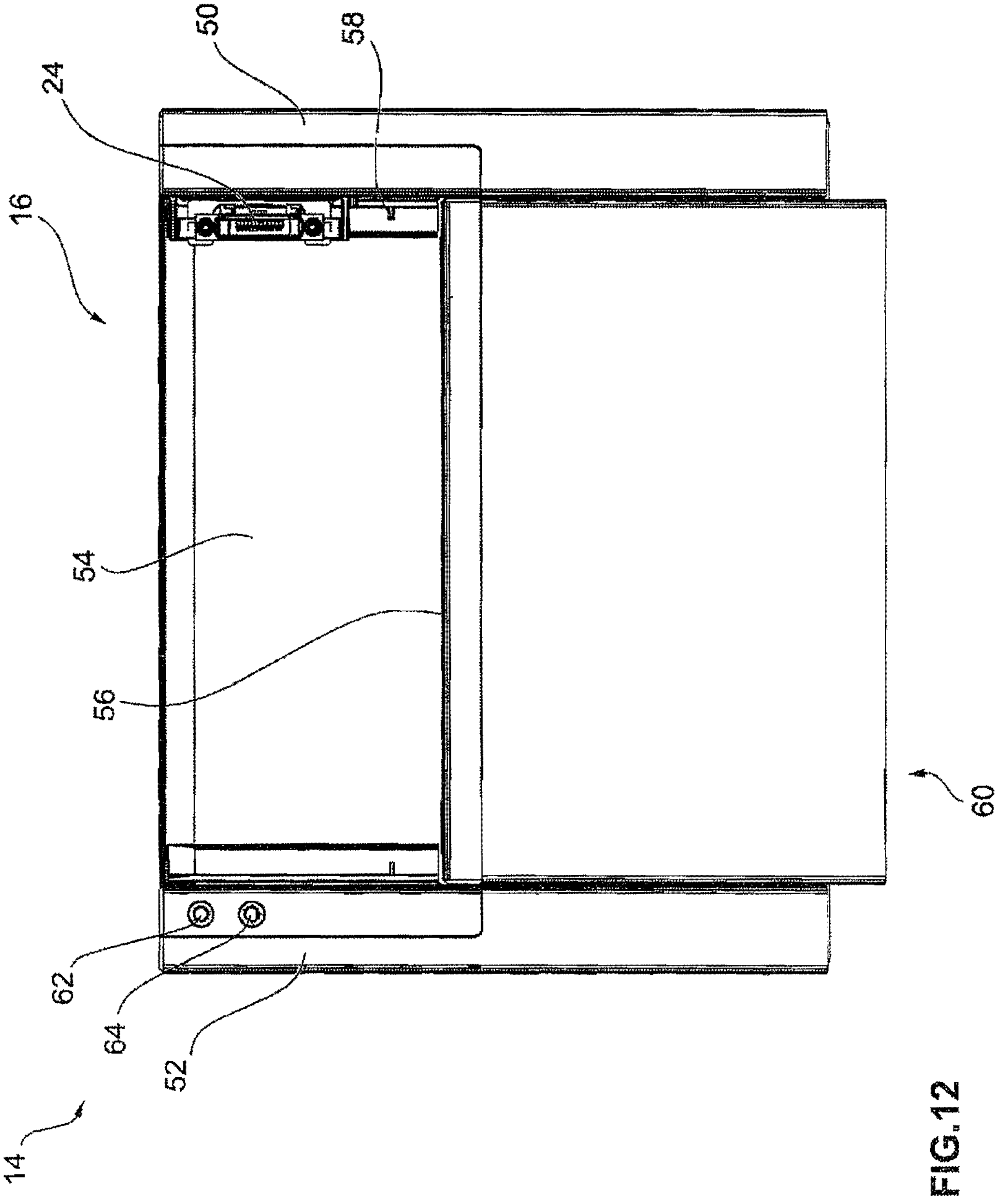
FIG. 12 shows a front view of the docking station.

FIG. 11 shows a side view of the docking station 14 according to FIG. 10. FIG. 12 shows a front view of the docking station 14 according to FIGS. 10 and 11.

Figure 13:
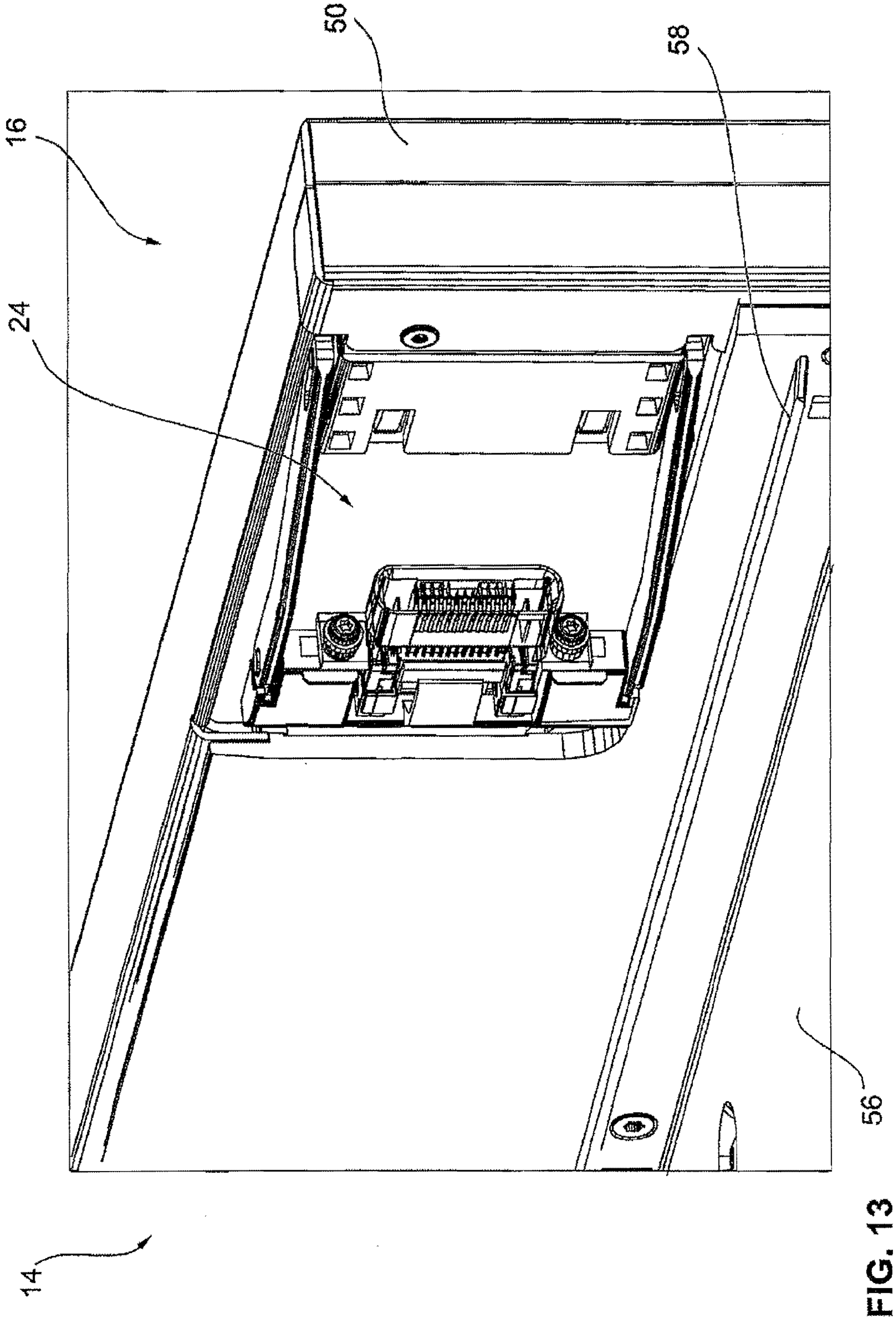
FIG. 13 shows a schematic perspective illustration of a plug connector of the docking station.

FIG. 13 shows a detail of the docking station 14 with a view of the plug connector 24. In particular, the plug connector 24 is structurally identical to the plug connector via which the cash cassette 12 is connected to a cash dispenser when the cash cassette 12 is received in a safe of the cash dispenser. The assembly of the plug connectors 22, 24 and the production of the plugged connection between the plug connectors 22, 24 is known from document WO 2009 127629 A1, the content of which is hereby incorporated in the present description by way of reference.

Figure 14:
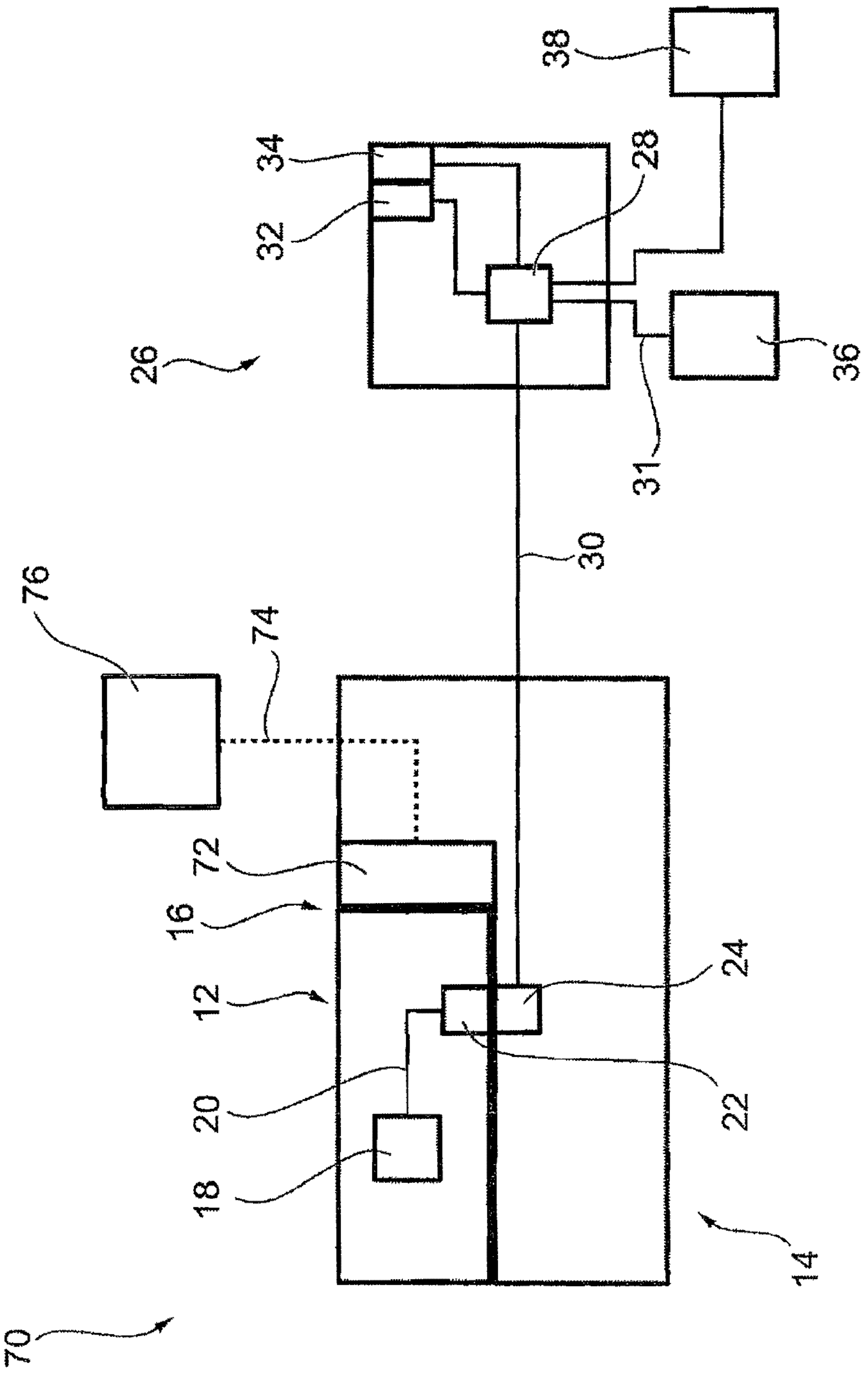
FIG. 14 shows a schematic illustration of a system for removing and for feeding banknotes from/to a banknote transporting unit in accordance with a third embodiment.

FIG. 14 shows a schematic illustration of a system 70 for feeding and/or removing banknotes from a cash cassette 12 in accordance with a further embodiment of the invention. In contrast to the embodiments shown in FIGS. 1 and 2, in the embodiment according to FIG. 14 the banknotes are not fed and/or removed manually to/from the cash cassette 12, but are fed automatically to the cash cassette 12 and/or are removed automatically from the cash cassette 12 via the first opening with the aid of a separating and/or stacking module 72 of the docking station 14. To this end, the shutter of the first opening is opened when the cash cassette 12 is inserted into the docking station 14 so that the banknotes can be removed from and/or fed to the cash cassette 12 by the separating and/or stacking module 72. The separating and/or stacking module 72 is connected via a transport path 74 to a banknote intermediate store 76, in which banknotes removed from the cash cassette 12 are stored and/or from which banknotes to be fed to the cash cassette 12 are removed. A separating and/or stacking module of this type is known from document WO 2009/127648 A2, the content of which is hereby incorporated in the present description by way of reference.

In the embodiment shown in FIG. 14, no manual intervention by members of service staff is thus necessary to empty and fill the cash cassette 12, and the cash cassette 12 can instead be emptied and/or filled in a fully automated manner. The likelihood of errors is thus reduced and the costs and time required are thus minimized.

Figure 15:
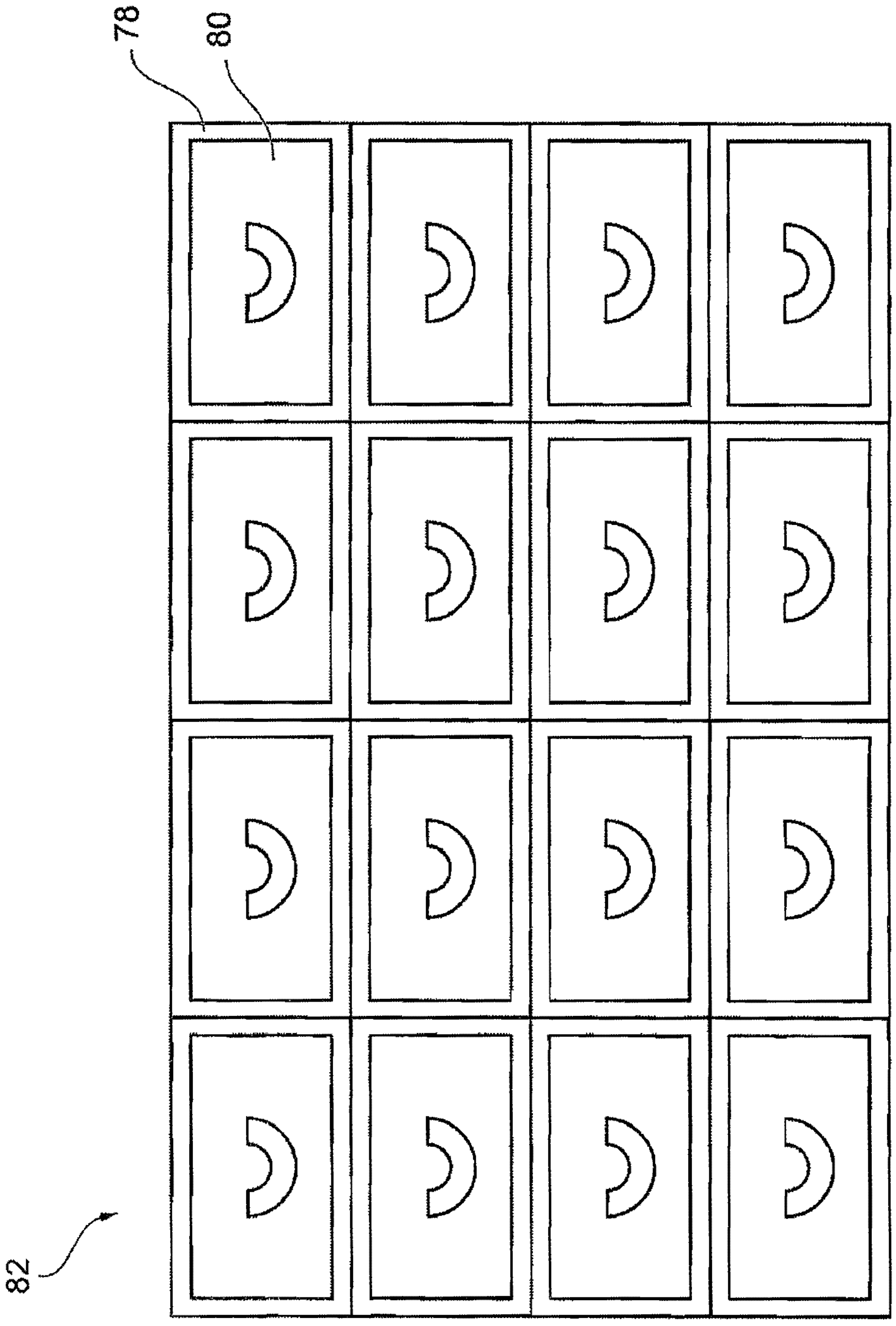
FIG. 15 shows a detail of a system for removing banknotes from and/or for feeding banknotes to a banknote transporting unit.

FIG. 15 shows a detail of a system for feeding and/or removing banknotes to/from cash cassettes in accordance with a further embodiment of the invention. In contrast to the previously described embodiments, the system according to this embodiment not only comprises a docking station 14, but a total of 16 docking stations, in which 16 cash cassettes can be received at the same time. One of these docking stations is denoted by reference sign 78 by way of example, and one of the received cash cassettes is denoted by reference sign 80 by way of example. The docking stations 78 are arranged in a 4×4 matrix so that a compact design is achieved. In an alternative embodiment of the invention, more or fewer than 16 docking stations 78 can also be provided and/or the provided docking stations 78 can be arranged differently.

Due to the provision of a plurality of docking stations 78, it is possible for a plurality of cash cassettes 80 to be filled automatically at the same time, whereby in particular the number of cash cassettes 80 to be filled per unit of time is increased and therefore the efficacy of the method is raised. Each docking station 78 has a separating and/or stacking module, via which the banknotes can be fed to and/or received from the cash cassette received in the respective docking station 78. In particular, the removed banknotes are all fed to a single central banknote intermediate store 76 and/or the banknotes to be fed are all removed from a central banknote intermediate store 76. Banknotes of different denominations can be stored in the banknote intermediate store 76, sorted in accordance with denomination. The arrangement 82 shown in FIG. 15 and consisting of a plurality of docking stations 78 is also referred to as a rack.

Figure 16:
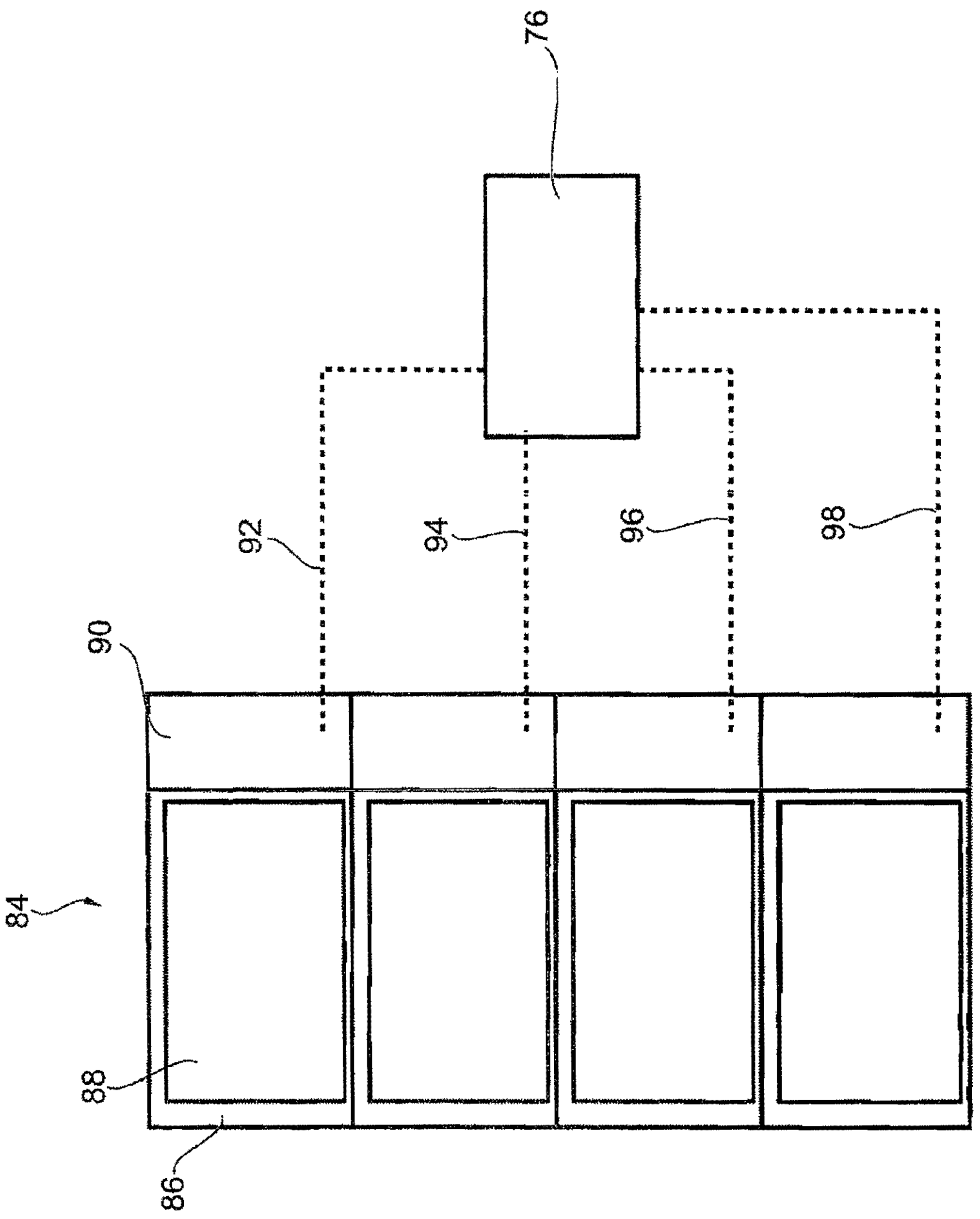
FIG. 16 shows a further schematic illustration of a detail of a system for feeding and for removing banknotes to/from a banknote transporting unit.

FIG. 16 shows a schematic illustration of a rack 84 of a system for feeding and/or removing banknotes to/from cash cassettes in accordance with a further embodiment of the invention. The rack 84 comprises four docking stations 86, in each of which a cash cassette 88 is received and from/to which banknotes can be removed and/or fed with the aid of a respective separating and/or stacking module 90. The separating and/or stacking modules 90 of the docking stations 86 are each connected via a separate transport path 92 to 98 to the banknote intermediate store 76 so that banknotes can be transported at the same time between the respective separating and stacking modules 90 and the banknote intermediate store 76.

Figure 17:
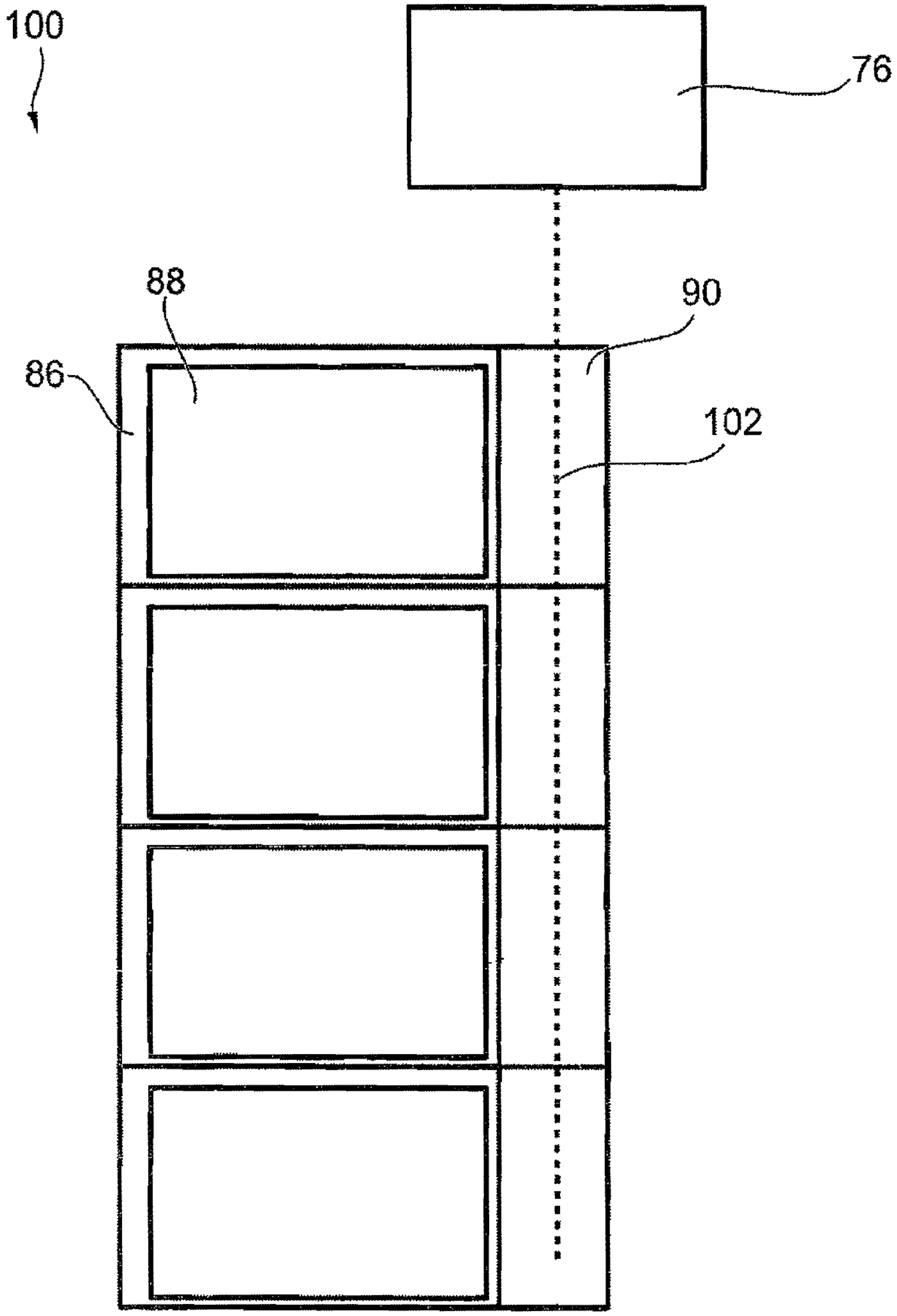
FIG. 17 shows a schematic illustration of a detail of a system for feeding and for removing banknotes to/from a banknote transporting unit in accordance with a further embodiment of the invention.

FIG. 17 shows a schematic illustration of a rack 100 in accordance with a further embodiment of the invention. In the rack 100 shown in FIG. 17, the separating and/or stacking modules 90 are connected to the banknote intermediate store 76 via a vertical transport path 102. A more compact design of the system is thus achieved.

Figure 18:
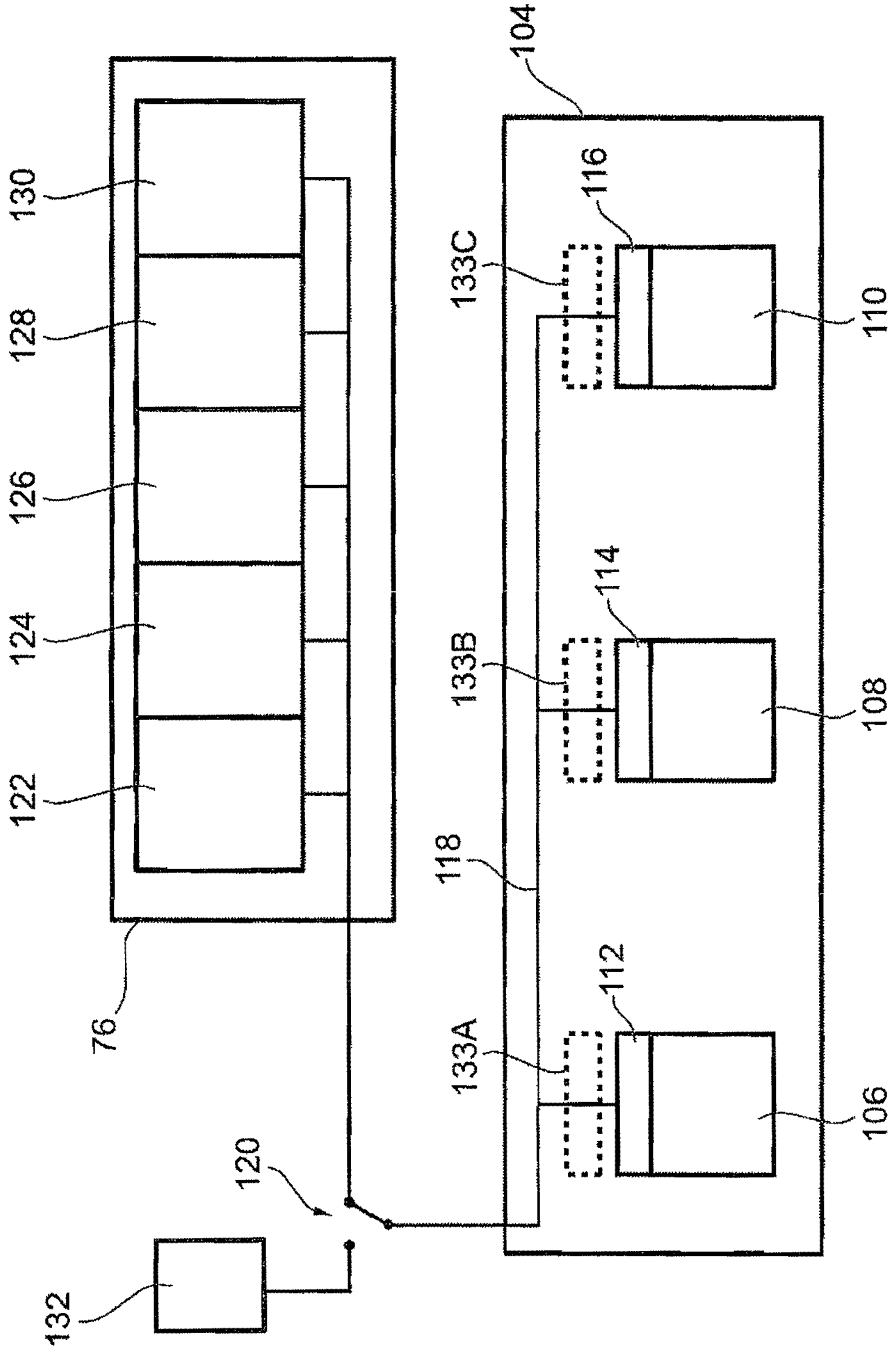
FIG. 18 shows a schematic illustration of a system for removing banknotes from and for feeding banknotes to a banknote transporting unit.

FIG. 18 shows a schematic illustration of a detail of a system for feeding banknotes to cash cassettes and/or for removing banknotes from cash cassettes in accordance with a further embodiment of the invention. The rack 104 comprises three docking stations 106 to 110, which each comprise a separating and/or stacking module 112 to 116 and are connected via a transport path 118 to a switch 120. In the case of the position of the switch 120 illustrated in FIG. 18, banknotes removed from the cash cassettes received in the docking stations 106 to 110 are fed to the banknote intermediate store 76 and banknotes stored in the banknote intermediate store 76 are removed therefrom and are fed to the banknotes received in the docking stations 106 to 110. In the exemplary embodiment shown in FIG. 18, the banknote intermediate store 76 comprises five deposit regions 120 to 130, one of which for example is intended for the receipt of 5 Euro banknotes, one of which is intended for the receipt of 10 Euro banknotes, one of which is intended for the receipt of 20 Euro banknotes, one of which is intended for the receipt of 50 Euro banknotes, and one of which is intended for the receipt of 100 Euro banknotes.

The system further comprises an input and output unit 132, via which the banknotes removed from the cash cassettes received in the docking stations 106 to 110 and not to be stored in the banknote intermediate store 76 can be discharged from the system. In particular, such banknotes are banknotes which are damaged, suspected of being counterfeit and/or have a high nominal value and therefore are seldom required for payout in cash dispensers.

Banknotes can also be fed to the system via the input and output unit 132, in particular via safe bags. The banknotes stacked in the safe bag are separated during the feeding process. In particular, banknotes fed via the input and output unit 132 are stored temporarily in the banknote intermediate store 76 before they are then fed as required into the cash cassettes received in the docking stations 106 to 110. In particular, it is necessary to feed banknotes via the input and output compartment if more banknotes are required to fill the cash cassettes via the docking stations 106 to 110 than are fed to the banknote intermediate store 76 by emptying the cash cassettes received in the docking stations 106 to 110. A counting device for counting the number of removed banknotes can be assigned to each of the docking stations 106 to 110.

Figure 19:
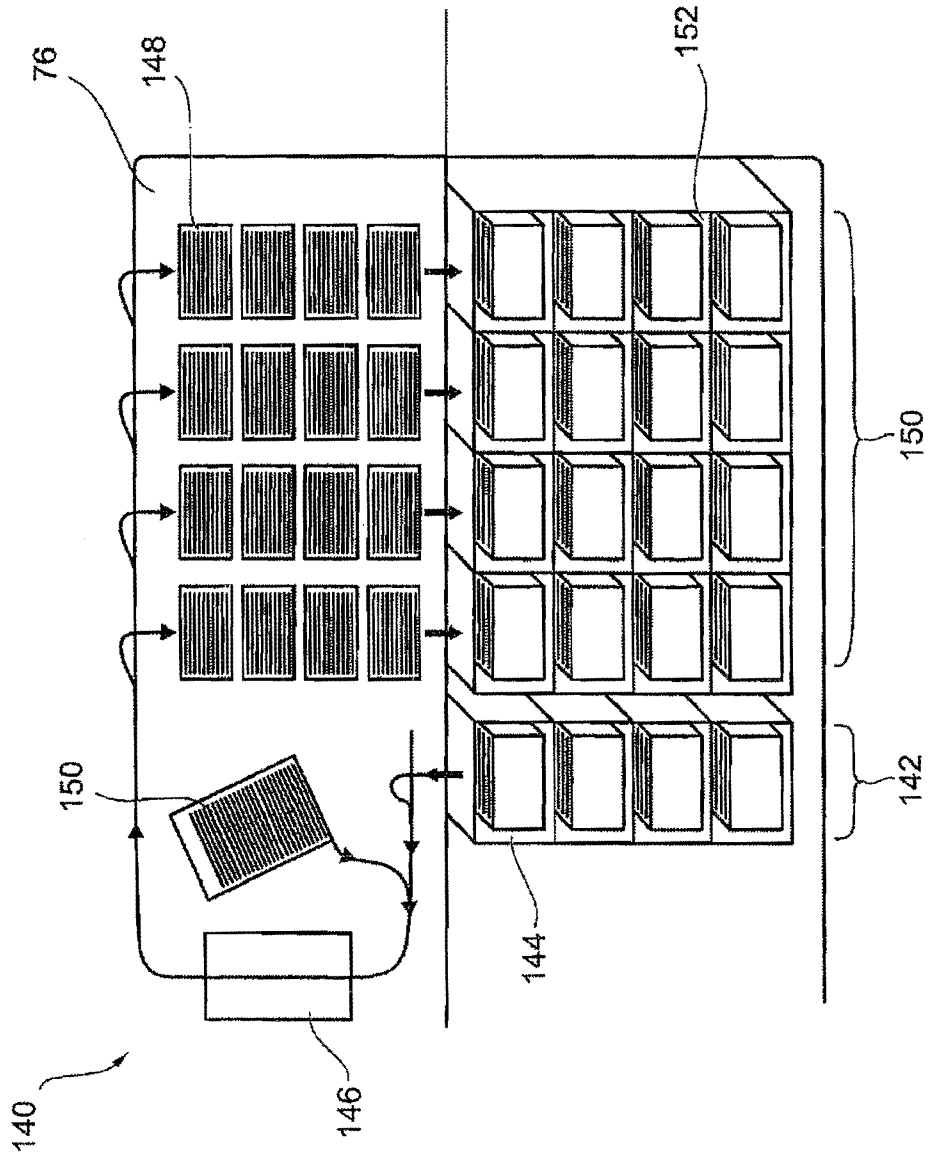
FIG. 19 shows a schematic illustration of a system for feeding banknotes to and for removing banknotes from a plurality of banknote transporting units in accordance with a further embodiment of the invention.

FIG. 19 shows a schematic illustration of a system 140 for feeding banknotes to cash cassettes and for removing banknotes from cash cassettes in accordance with a further embodiment of the invention. The system 140 comprises a first rack 142, which comprises four docking stations, one of which is denoted by reference sign 144 by way of example. Banknotes can be fed to the system 140 via the first rack 142. To this end, banknote transporting containers are received in the docking stations 144 and banknotes are removed from said banknote transporting containers and are then fed to a banknote intermediate store 76. The banknote transporting containers may be cash cassettes, roll storage systems or safe bags. The banknote transporting containers may originate from the depositing cycle or from the recycling cycle. The depositing cycle is understood to mean when banknotes are merely deposited in the banknote transporting container, but not removed therefrom, and the banknote transporting container is thus merely used for the deposit of banknotes. By contrast, in a recycling cycle, banknotes are both deposited in and paid out from the banknote transporting containers, wherein the deposited banknotes are available to be paid out again.

Once checked by a sensor 146, in particular for fitness and/or authenticity, the banknotes removed from the first rack 142 are fed to the banknote intermediate store 76. In the exemplary embodiment shown in FIG. 19, the banknote intermediate store 76 comprises 16 deposit compartments, one of which is denoted by reference sign 148 by way of example.

The system 140 further comprises an input compartment 150, via which the banknotes can be fed to the system 140 either individually or in the form of a stack, wherein the banknotes which have been input via the input compartment 150 are likewise fed to the banknote intermediate store 76 once they have been checked by a sensor 146.

The system 140 further comprises a second rack 150, which, in the exemplary embodiment shown in FIG. 19, comprises 16 docking stations, one of which is denoted by reference sign 152 by way of example. The docking stations 152 of the second rack 150 are used to fill the banknote transporting containers received therein. To this end, the docking stations 152 of the second rack 150 are connected via transport paths to the intermediate store 76.

On the whole, a combined depositing and recycling handling process is thus enabled by the system 140 described in FIG. 19. Due to this dual automation concept of pure depositing and of filling up of recycling banknote transporting containers, only one banknote cycle (what is known as a "cash cycle") is necessary and can be formed effectively.

In particular, purely depositing banknote transporting containers and/or recycling transport containers, in which the banknotes of a number of denominations are stored in a mixed manner, are inserted into the first rack 142 for emptying. Cash cassettes in which the banknotes have been stored in a sorted manner, that is to say merely banknotes of one denomination, are preferably not fed to the system 140, but are fed directly to other cash dispensers, automated points of sale and/or automated safes.

Both empty cash cassettes and partially filled cash cassettes, which merely have to be filled up, can be fed to the second rack 150. In particular, the cash cassettes are filled with approximately 1400 banknotes. The banknotes required to fill the cash cassettes received in the second rack 150 are removed from the banknote intermediate store 76. In particular, the banknotes required for this are fed to the banknote intermediate store 76 via depositing banknote transporting containers via the first rack 142, preferably via safe bags.

Cash cassettes in particular are used for intermediate storage of the banknotes in the banknote intermediate store 76. No other components parts therefore have to be used, thus reducing complexity and cost. To this end, the cash cassettes are in particular cascaded to form cassette towers so as to ensure a continuous depositing process.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

The invention claimed is:

1. A system for removing banknotes from at least one banknote transporting unit and/or for feeding banknotes to the banknote transporting unit, comprising:

said system having a docking station, which comprises a receiving region, not secured by a safe, for receiving the banknote transporting unit, and having a control unit for controlling the docking station, wherein the docking station comprises a first transmitting and/or receiving unit for transmitting and/or receiving data, the first transmitting and/or receiving unit is connected to the control unit via a data transfer element for transferring received data and/or data to be transmitted, the banknote transporting unit comprises a storage element for storing data and a second transmitting and/or receiving unit for transmitting and/or receiving data, in a first operating state, the banknote transporting unit is received in the receiving region of the docking station and a data transfer connection exists between the first transmitting and/or receiving unit and the second transmitting and/or receiving unit, via which data can be transferred between the banknote transporting unit and the control unit, and wherein, in a second operating state, the banknote transporting unit is arranged outside the receiving region of the docking station and no data transfer connection exists between the first transmitting and/or receiving unit and the second transmitting and/or receiving unit;

wherein the banknote transporting unit comprises a first opening, via which banknotes can be fed to and/or removed from the banknote transporting unit when the banknote transporting unit is inserted in a cash dispenser, an automated safe and/or an automated point of sale, and in that the banknote transporting unit comprises a second opening, which can be closed by a lid, for manually removing and/or manually feeding banknotes; and wherein at least one sensor is provided for detecting opening of the lid, in that manipulation data are stored in the storage element when the lid is opened in the second operating state, and in that, in the first operating state, the control unit transfers release data via the data transfer connection so that the lid can be opened for manual filling of the banknote transporting unit and/or for manual emptying of banknotes, without manipulation data being stored in the storage element.

2. The system according to claim 1, wherein the banknote transporting unit is a cash cassette or comprises a roll storage system.

3. The system according to claim 1, wherein the first transmitting and/or receiving unit comprises a first plug connector, in that the second transmitting and/or receiving unit comprises a second plug connector formed in a complementary manner to the first plug connector, and in that, in the first operating state, a plugged connection is produced between the first plug connector and the second plug connector.

4. The system according to claim 1, wherein the docking station comprises a stand area for positioning of the docking station, in that the receiving region as a support area on which the banknote transporting unit rests in the first operating state, and in that the stand area and the support area are arranged at an angle to one another in a range of 10° and 60°.

5. The system according to claim 1, wherein a separating and/or stacking module for automatically feeding banknotes through the first opening and/or for removing banknotes from the banknote transporting unit through the first opening is provided.

6. The system according to claim 1, wherein the first opening can be closed by a shutter, in that a sensor for detecting opening of the shutter is provided, in that, when the shutter is opened in the second operating state, manipulation data are stored in the storage element, and in that, in the first operating state, the control unit transfers release data via the data transfer connection so that the shutter can be opened to fill the banknote transporting unit and/or to remove banknotes, without manipulation data being stored in the storage element.

7. The system according to claim 1, wherein in the first operating state, manipulation data stored in the storage element can be transferred to the control unit and can be output to a member of service staff via a display unit, and in that, once the manipulation data have been transferred, they are deleted from the storage element of the banknote transporting unit.

8. The system according to claim 1, wherein in the first operating state, data containing information regarding the state of the banknote transporting unit, in particular data containing information regarding the supply of banknotes in the banknote transporting unit, manipulation data, data containing information regarding multiple withdrawals, maintenance data regarding transport elements of the banknote transporting unit and/or maintenance data of an inking kit of the banknote transporting unit, can be transferred to the control unit via the data transfer connection.

9. The system according to claim 1, wherein in the first operating state, stops for defining a holding region of the banknote transporting unit for holding the banknotes can be adjusted between at least two positions to change the denominations of the banknotes receivable in the banknote transporting unit, and in that the control unit stores data containing information regarding the position of the stops in the storage element of the banknote transporting unit.

10. The system according to claim 1, wherein data containing information regarding multiple withdrawals are stored in the storage element, these data being transferrable in the first operating state from the storage element to the control unit, and in that, according to this data, the control unit generates output data, which can be displayed via a display unit.

11. The system according to claim 1, wherein the control unit processes program data of a program to assist a member of service staff tasked with filling or emptying the banknote transporting unit, and in that the system comprises a display unit, via which instructions are displayed to the member of service staff during processing of the program data.

12. The system according to claim 11, wherein an instruction to open a lid, information regarding manipulation, information regarding a multiple withdrawal, an instruction to count the supply of banknotes received in the banknote transporting unit, a request to input the established supply, an instruction regarding which banknotes are to be used to fill the banknote transporting unit and/or maintenance information is displayed to the member of service staff via the display unit.

13. The system according to claim 1, wherein in the first operating state, either the banknote transporting unit is emptied completely in a first operating mode, or only some of the banknotes arranged in the banknote transporting unit are emptied in a second operating mode.

14. The system according to claim 1, wherein data containing information regarding the denomination of the received banknotes, data containing information regarding the serial numbers of the banknotes, data containing information regarding the sequence in which the banknotes have been deposited, the number of received banknotes, attempts to manipulate the banknote transporting unit, multiple withdrawals, serial number of the banknote transporting unit, serial number of a target device and/or serial number of the last docking station in which the banknote transporting unit was received is stored in the storage element.

15. The system according to claim 3, wherein electrical energy for supplying electrical consumers of the banknote transporting unit can be transferred via the plugged connection.

16. The system according to claim 1, wherein a separating and/or stacking module for automatically feeding banknotes to and/or for removing banknotes from the banknote transporting unit and an intermediate store, from which banknotes can be removed and fed to the banknote transporting unit and/or to which banknotes removed from the banknote transporting unit can be fed are provided.

17. The system according to claim 16, wherein a counting device for establishing the supply of banknotes in the banknote transporting unit is provided.

18. The system according to claim 17, wherein the control unit controls the separating and/or stacking module according to manipulation data and/or data containing information regarding multiple withdrawals stored in the storage element, in such a way that the separating and/or stacking module removes all banknotes received in the banknote transporting unit and feeds them to the counting device, and in that the counting device transfers data containing information regarding the number of banknotes to the control unit.

19. The system according to claim 16, wherein an input and/or output unit for feeding banknotes to the system and/or for removing banknotes from the system is provided.

20. The system according to claim 19, wherein the input and/or output unit for feeding and/or for removing the banknotes comprises a receiving region for receiving a cash cassette and/or a safe bag.

21. The system according to claim 16, wherein the system comprises a plurality of docking stations and a plurality of separating and/or stacking modules, and in that banknotes can be fed and/or removed, preferably simultaneously, to/from the banknote transporting units received in the docking stations via the separating and/or stacking modules.

22. A system for removing banknotes from, and feeding banknotes to, a banknote transporting unit, the system comprising:

a docking station including:

a receiving region unsecured by a safe and configured to receive the banknote transporting unit; and a first transmitting and/or receiving unit configured to transmit and/or receive data;

a control unit configured to control the docking station, the first transmitting and/or receiving unit is connected to the control unit with a data transfer element for transferring received data and/or data to be transmitted;

the banknote transporting unit including:

a storage element configured to store data;

a second transmitting and/or receiving unit configured to transmit and/or receive data;

a first opening through which banknotes can be fed to, and/or removed from, the banknote transporting unit when the banknote transporting unit is inserted in a cash dispenser, an automated safe, and/or an automated point of sale;

a second opening through which banknotes can be manually removed and/or manually fed, the second opening configured to be closed by a lid; and at least one sensor configured to detect opening of the lid;

wherein:

in a first operating state, the banknote transporting unit is received in the receiving region of the docking station and a data transfer connection is present between the first and the second transmitting and/or receiving units to permit data transfer between the banknote transporting unit and the control unit;

in a second operating state, the banknote transporting unit is arranged outside the receiving region of the docking station and no data transfer connection exists between the first and the second transmitting and/or receiving units; and manipulation data is stored in the storage element when the lid is opened in the second operating state; and in the first operating state, the control unit transfers release data via the data transfer connection so that the lid can be opened for manual filling of the banknote transporting unit and/or for manual emptying of banknotes without manipulation data being stored in the storage element.

* * * * *